US008642670B2

(12) United States Patent
Mohmeyer et al.

(10) Patent No.: US 8,642,670 B2
(45) Date of Patent: Feb. 4, 2014

(54) COARSE-CELL POLYURETHANE ELASTOMERS

(75) Inventors: Nils Mohmeyer, Osnabrueck (DE); Ralf Fritz, Bissendorf-Schledehausen (DE); Annika Habicht, Bohmte (DE); Daniela Tepe, Dinklage (DE); Frank Prissok, Lemfoerde (DE); Michael Harms, Diepholz (DE); Bernd Bruchmann, Freinsheim (DE); Daniel Schoenfelder, Brussels (BE); Daniel Freidank, Lemfoerde (DE); Andreas Emge, Lemfoerde (DE); Andrea Eisenhardt, Vechta (DE)

(73) Assignee: BASF SE, Ludwigshafen (DE)

( * ) Notice: Subject to any disclaimer, the term of this patent is extended or adjusted under 35 U.S.C. 154(b) by 417 days.

(21) Appl. No.: 12/921,325

(22) PCT Filed: Mar. 13, 2009

(86) PCT No.: PCT/EP2009/052996
§ 371 (c)(1),
(2), (4) Date: Sep. 7, 2010

(87) PCT Pub. No.: WO2009/112576
PCT Pub. Date: Sep. 17, 2009

(65) Prior Publication Data
US 2011/0021652 A1   Jan. 27, 2011

(30) Foreign Application Priority Data

Mar. 14, 2008 (EP) .................................... 08152768
Jul. 7, 2008 (EP) .................................... 08159849
Aug. 13, 2008 (EP) .................................... 08162280
Dec. 23, 2008 (EP) .................................... 08172757

(51) Int. Cl.
*C08G 18/28* (2006.01)
(52) U.S. Cl.
USPC ........... 521/170; 521/130; 521/159; 521/172; 521/173; 521/174; 521/176
(58) Field of Classification Search
USPC .......... 521/130, 159, 170, 172, 173, 174, 176
See application file for complete search history.

(56) References Cited

U.S. PATENT DOCUMENTS

| | | | |
|---|---|---|---|
| 2,965,584 A | 12/1960 | Elkin | |
| 3,304,273 A | 2/1967 | Stamberger | |
| 3,383,351 A | 5/1968 | Stamberger | |
| 3,523,093 A | 8/1970 | Stamberger | |
| 3,660,326 A | 5/1972 | Mallabar | |
| 4,287,307 A | 9/1981 | Hostettler | |
| 4,764,537 A | 8/1988 | Horn et al. | |
| 6,329,441 B1 | 12/2001 | Okubo et al. | |
| 6,331,577 B1* | 12/2001 | Volkert et al. ................. | 521/159 |
| 2002/0132870 A1 | 9/2002 | Younes | |
| 2003/0138621 A1* | 7/2003 | Bollmann et al. ......... | 428/318.6 |
| 2007/0043133 A1 | 2/2007 | Carvalho et al. | |
| 2007/0161731 A1 | 7/2007 | Carvalho et al. | |
| 2007/0185223 A1* | 8/2007 | Ortalda ........................ | 521/172 |
| 2008/0146983 A1 | 6/2008 | Park et al. | |

FOREIGN PATENT DOCUMENTS

| | | |
|---|---|---|
| DE | 111 394 | 7/1899 |
| DE | 1 093 080 | 11/1960 |
| DE | 1 152 536 | 8/1963 |
| DE | 1 152 537 | 8/1963 |
| DE | 1 925 682 | 1/1970 |
| DE | 36 07 447 | 9/1987 |
| DE | 101 38 216 | 2/2003 |
| DE | 101 47 712 | 4/2003 |
| DE | 101 63 163 | 7/2003 |
| EP | 0 035 389 | 9/1981 |
| EP | 0 153 639 | 9/1985 |
| EP | 0 250 351 | 12/1987 |
| EP | 0 903 360 | 3/1999 |
| EP | 1 225 199 | 7/2002 |
| EP | 1 626 063 | 2/2006 |
| EP | 1 935 913 | 6/2008 |
| WO | 96 11219 | 4/1996 |
| WO | 99 33893 | 7/1999 |
| WO | 2004 013215 | 2/2004 |
| WO | 2005 026234 | 3/2005 |
| WO | 2005 098763 | 10/2005 |
| WO | 2006 058675 | 6/2006 |
| WO | 2008 071622 | 6/2008 |
| WO | 2008 087078 | 7/2008 |

OTHER PUBLICATIONS

U.S. Appl. No. 13/028,624, filed Feb. 16, 2011, Roller et al.
U.S. Appl. No. 13/266,590, filed Oct. 27, 2011, Prissok et al.
International Search Report issued Jun. 29, 2009 in PCT/EP09/052996 filed Mar. 13, 2009.

* cited by examiner

*Primary Examiner* — John Cooney
(74) *Attorney, Agent, or Firm* — Oblon, Spivak, McClelland, Maier & Neustadt, L.L.P.

(57) ABSTRACT

The present invention relates to an open-cell polyurethane foam comprising polyester and polyether structures and having a density of 70 to 300 g/L, 1 to 20 cells/cm, a rebound intensity greater than 30%, an elongation at break of greater than 200%, a tear propagation resistance of greater than 1.2 N/mm and a tensile strength of greater than 200 kPa. The present invention further relates to a process for producing inventive open-cell polyurethane sponges and to the use thereof as a pipe cleaning sponge.

28 Claims, No Drawings

COARSE-CELL POLYURETHANE ELASTOMERS

The present invention relates to an open-cell polyurethane foam comprising polyester and polyether structures and having a density of 70 to 300 g/L, 1 to 20 cells/cm, a rebound intensity greater than 30%, an elongation at break of greater than 200%, a tear propagation resistance of greater than 1.2 N/mm and a tensile strength of greater than 200 kPa. The present invention further relates to a process for producing inventive open-cell polyurethane sponges and to the use thereof as a pipe cleaning sponge.

Further embodiments of the present invention can be inferred from the claims, the description and the examples. It will be appreciated that the features of the subject matter of the invention which have been specified above and are still to be explained below are useable not only in the particular combination specified, but also in other combinations without leaving the scope of the invention.

The use of foams based on polyurethanes for cleaning purposes is known and is described, for example in WO 2006058675 or EP 903360. A disadvantage of such cleaning sponges is usually poor mechanical properties. For instance, known cleaning sponges based on polyurethanes in the density range less than 300 g/dm$^3$ exhibit a usually insufficient water absorption capacity, too small a cell size and only limited mechanical properties, for example too low a tear resistance and elongation at break or too low a tear propagation resistance. For this reason, only cleaning sponges based on rubber or latex are known for demanding applications which make high demands on the mechanical properties of the cleaning sponge, such as pipe cleaning. However, these are producible only with a high level of technical complexity and the tear propagation properties of these foams are limited.

It was therefore an object of the present invention to provide sponges with a density of 70 to 300 g/L, which do not have these disadvantages.

The object of the present invention is achieved by an open-cell polyurethane foam having a density of 70 to 300 g/L, 1 to 20 cells/cm, a rebound resilience greater than 30%, an elongation at break of greater than 200%, a tear propagation resistance of greater than 1.2 N/mm and a tensile strength of greater than 200 kPa. In a particular embodiment, the inventive open-cell polyurethane foam comprises polyester and polyether structures.

An open-cell polyurethane foam is understood to mean a polyurethane foam to DIN 7726, which has more than 50% open cells. The open cell content is preferably at least 70%, more preferably at least 85% and especially at least 90%, measured to DIN ISO 4590.

The inventive open-cell polyurethane foams can be produced by different methods. In a first embodiment, the inventive open-cell polyurethane foams are obtained by a process in which a) compounds having isocyanate groups and based on a1) MDI and optionally a2) polyetherols and/or a3) polyesterols, where the content of MDI having a functionality of greater than 2 is less than 30% by weight, based on the total weight of the MDI a1), b) relatively high molecular weight compounds having groups reactive toward isocyanate, comprising polyetherols and/or polyesterols, c) blowing agent comprising water and optionally, d) chain extender, e) catalyst and f) other assistants and/or additives are mixed to give a reaction mixture and allowed to react fully to give the polyurethane foam, the compound a2), a3) and b) used being at least one polyetherol and at least one polyesterol, and the content of polyetherol being greater than 5% by weight, based on the total weight of components a2), a3) and b) and the mean functionality of compounds a2), a3) and b) being less than 2.4.

In a second embodiment, the inventive open-cell polyurethane foams are obtained by a process in which a) compounds having isocyanate groups and based on a1) MDI and optionally a2) polyetherols and/or a3) polyesterols, where the content of MDI having a functionality of greater than 2 is less than 30% by weight, based on the total weight of the MDI a1), b) relatively high molecular weight compounds having groups reactive toward isocyanate, comprising polyetherols and/or polyesterols, c) blowing agent comprising water and optionally d) chain extender, e) catalyst and f) other assistants and/or additives are mixed to give a reaction mixture and allowed to react fully to give the polyurethane foam, the relatively high molecular weight compound b) used being a mixture comprising polyester polyol and high-functionality polyetherol having a functionality of at least 4, and a molecular weight of 5000 to 30 000 g/mol.

In a third embodiment, the inventive open-cell polyurethane foams are obtained by a process in which a) compounds having isocyanate groups and based on a1) MDI and optionally a2) polyetherols and/or a3) polyesterols, where the content of MDI having a functionality of greater than 2 is less than 30% by weight, based on the total weight of the MDI a1), b) relatively high molecular weight compounds having groups reactive toward isocyanate, comprising polyetherols and/or polyesterols, c) blowing agent comprising water and optionally d) chain extender, e) catalyst and f) other assistants and/or additives are mixed to give a reaction mixture and allowed to react fully to give the polyurethane foam, the relatively high molecular weight compound b) used being a mixture comprising polyester polyol and copolymer (C) having a functionality toward isocyanate of at least 4, and a molecular weight of 20 000 to 200 000 g/mol.

In a fourth embodiment, the inventive open-cell polyurethane foams are obtained by a process in which a) compounds having isocyanate groups and based on a1) MDI and optionally a2) polyetherols and/or a3) polyesterols, where the content of MDI having a functionality of greater than 2 is less than 30% by weight, based on the total weight of the MDI a1), b) relatively high molecular weight compounds having groups reactive toward isocyanate, comprising polyetherols and/or polyesterols, c) blowing agent comprising water and optionally d) chain extender, e) catalyst and f) other assistants and/or additives are mixed to give a reaction mixture and allowed to react fully to give the polyurethane foam, the relatively high molecular weight compound b) used being a mixture comprising polyester polyol and hydrophobic hyperbranched polyester.

In a fifth embodiment, the inventive open-cell polyurethane foams are obtained by a process in which a) compounds having isocyanate groups and based on a1) MDI and optionally a2) polyetherols and/or a3) polyesterols, where the content of MDI having a functionality of greater than 2 is less than 30% by weight, based on the total weight of the MDI a1), b) relatively high molecular weight compounds having groups reactive toward isocyanate, comprising polyetherols and/or polyesterols, c) blowing agent comprising water and optionally d) chain extender, e) catalyst and f) other assistants and/or additives are mixed to give a reaction mixture and allowed to react fully to give the polyurethane foam, the relatively high molecular weight compound b) used being a mixture comprising polyester polyol and hydrophobic hyperbranched polycarbonate.

The compounds having isocyanate groups used to prepare the inventive polyurethane foams comprise compounds based on a1) diphenylmethane diisocyanate (referred to hereinafter as MDI), where the content of MDI having a functionality of greater than 2 is less than 30% by weight, preferably less than 20% by weight and especially less than 10% by weight, based on the total weight of the MDI. Examples are diphenylmethane 4,4'-diisocyanate, diphenylmethane 2,4''-diisocyanate, and the mixtures of monomeric diphenylmethane diisocyanates and higher polycyclic homologs of diphenylmethane diisocyanate (polymer MDI). Preference is given to using 4,4'-MDI. The 4,4'-MDI used with preference may comprise 0 to 20% by weight of 2,4'-MDI and small amounts, up to 10% by weight, of allophanate-, carbodiimide- or uretonimine-modified MDI. It is also possible to use small amounts of polyphenylenepolymethylene polyisocyanate (polymer MDI). In addition to MDI, it is optionally also possible for further isocyanates, such as toluene diisocyanate, isophorone diisocyanate or hexamethylene diisocyanate to be present in small amounts. Preferably, no further isocyanates are present aside from MDI and derivatives thereof.

The compounds (a) having isocyanate groups are preferably used in the form of polyisocyanate prepolymers. These polyisocyanate prepolymers are obtainable by reacting the above-described MDI (a-1), for example at temperatures of 30 to 100° C., preferably at about 80° C., with polyetherols (a2) and/or polyesterols (a3), to give the prepolymer. Polyetherols (a2) and polyesterols (a3) used are preferably the polyetherols and polyesterols described under b). In addition to polyisocyanate prepolymers based on polyether and polyisocyanate prepolymers based on polyester and mixtures thereof, it is also possible to use polyisocyanate prepolymers based on polyethers and polyesters, and mixtures thereof with the aforementioned polyisocyanate prepolymers. The compounds a) having isocyanate groups used are preferably polyisocyanate prepolymers based on polyether and mixtures of polyisocyanate prepolymers based on polyether and polyisocyanate prepolymers based on polyester. The NCO content of the prepolymers is preferably in the range from 6% to 30%, more preferably from 10% to 28% and especially from 13% to 25%.

Optionally, customary chain extenders (a4) are added to the polyols mentioned in the course of preparation of the isocyanate prepolymers. Such substances are described hereinafter under d).

As relatively high molecular weight compounds having groups reactive toward isocyanate, comprising polyetherols and/or polyesterols b), it is possible to use compounds having a molecular weight of greater than 450 g/mol and groups reactive toward isocyanates. Preference is given to using polyetherols and/or polyesterols.

Polyetherols are prepared by known processes, for example by anionic polymerization with alkali metal hydroxides or alkali metal alkoxides as catalysts and with addition of at least one starter molecule which usually contains 2 to 3 reactive hydrogen atoms in bonded form, or by cationic polymerization with Lewis acids, such as antimony pentachloride or boron fluoride etherate, from one or more alkylene oxides having 2 to 4 carbon atoms in the alkylene radical. Suitable alkylene oxides are, for example, tetrahydrofuran, 1,3-propylene oxide, 1,2- or 2,3-butylene oxide and preferably ethylene oxide and 1,2-propylene oxide. The catalysts used may also be multimetal cyanide compounds, known as DMC catalysts. The alkylene oxides may be used individually, in alternating succession or as mixtures. The polyether polyols preferably contain at least 75% propylene oxide. When the polyether polyol is used to prepare polyisocyanate prepolymers, preference is given to preparing the polyether polyols using exclusively propylene oxide as the alkylene oxide.

Useful starter molecules include water or di- and trihydric alcohols, such as ethylene glycol, 1,2- and 1,3-propanediol, diethylene glycol, dipropylene glycol, 1,4-butanediol, glycerol or trimethylolpropane.

The polyether polyols, preferably polyoxypropylenepolyoxyethylenepolyols, preferably have a functionality of less than 4, preferably of 1.7 to 3, more preferably of 2 to 2.7, and molecular weights of 450 to 12 000, preferably of 500 to 12 000, more preferably of 700 to 8000 and especially of 900 to 3000 g/mol.

Polyester polyols can be prepared, for example from organic dicarboxylic acids having 2 to 12 carbon atoms, preferably aliphatic dicarboxylic acids having 4 to 6 carbon atoms and polyhydric alcohols, preferably diols, having 2 to 12 carbon atoms, preferably 2 to 6 carbon atoms. Useful dicarboxylic acids include, for example: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids may be used either individually or in a mixture with one another. Instead of the free dicarboxylic acids, it is also possible to use the corresponding dicarboxylic acid derivatives, for example dicarboxylic esters of alcohols having 1 to 4 carbon atoms or dicarboxylic anhydrides. Preference is given to using dicarboxylic acid mixtures of succinic acid, glutaric acid and adipic acid in ratios of, for example, 20 to 35:35 to 50:20 to 32 parts by weight, and especially adipic acid. Examples of dihydric and polyhydric alcohols, especially diols, are: ethanediol, diethylene glycol, 1,2- and 1,3-propanediol, dipropylene glycol, tripropylene glycol, 1,4-butanediol, 1,5-pentanediol, 3,3-dimethylpentane-1,5-diol, 1,6-hexanediol, 1,10-decanediol, glycerol and trimethylolpropane. Preference is given to using ethanediol, diethylene glycol, 1,4-butanediol, 1,5-pentanediol and 1,6-hexanediol. It is also possible to use polyester polyols formed from lactones, e.g. ε-caprolactone or hydroxycarboxylic acids, e.g. w-hydroxycaproic acid. Preference is given to using ethanediol, diethylene glycol, 1,4-butanediol, 1,5-pentanediol and/or 1,6-hexanediol.

To prepare the polyester polyols, the organic, e.g. aromatic and preferably aliphatic polycarboxylic acids and/or derivatives and polyhydric alcohols can be polycondensed without catalyst or preferably in the presence of esterification catalysts, appropriately in an atmosphere of inert gas, for example nitrogen, carbon monoxide, helium, argon, inter alia, in the melt at temperatures of 150 to 250° C., preferably 180 to 220° C., optionally under reduced pressure, down to the desired acid number which is preferably less than 10, more preferably less than 2. In a preferred embodiment, the esterification mixture is polycondensed under standard pressure at the abovementioned temperatures down to an acid number of 80 to 30, preferably 40 to 30, under standard pressure and then under a pressure of less than 500 mbar, preferably 50 to 150 mbar. Useful esterification catalysts include, for example iron catalysts, cadmium catalysts, cobalt catalysts, lead catalysts, zinc catalysts, antimony catalysts, magnesium catalysts, titanium catalysts and tin catalysts in the form of metals, metal oxides or metal salts. However, the polycondensation can also be performed in the liquid phase in the presence of diluents and/or entraining agents, for example benzene, toluene, xylene, or chlorobenzene for azeotropic distillative removal of the water of condensation. To prepare the polyester polyols, the organic polycarboxylic acids and/or derivatives and polyhydric alcohols are advantageously polycondensed in a molar ratio of 1:1 to 1.8, preferably 1:1.05 to 1.2. Optionally, it is also possible to add customary monoacids in the condensation as chain terminators. The polyester polyols obtained preferably have a functionality of 1.8 to 4, especially of 2 to 3, and a molecular weight of 480 to 3000, and preferably 1000 to 3000 g/mol.

Also suitable as relatively high molecular weight compounds b) having at least two hydrogen atoms reactive toward isocyanate are polymer-modified polyols, preferably polymer-modified polyesterols or polyetherols, more preferably graft polyetherols or graft polyesterols, especially graft polyetherols. These are what are known as polymer polyols, which typically have a content of preferably thermoplastic polymers of 5 to 60% by weight, preferably 10 to 55% by weight, more preferably 30 to 55% by weight and especially 40 to 50% by weight. These polymer polyesterols are described, for example in WO 05/098763 and EP-A-250 351 and are typically prepared by free-radical polymerization of suitable olefinic monomers, for example styrene, acrylonitrile, (meth)acrylates, (meth)acrylic acid and/or acrylamide, in a polyesterol which serves as the graft base. The side chains generally form as a result of transfer of the free radicals from growing polymer chains to polyesterols or polyetherols. The polymer polyol comprises, as well as the graft copolymer, predominantly the homopolymers of the olefins, dispersed in unchanged polyesterol or polyetherol.

In a preferred embodiment, the monomers used in excess are acrylonitrile, styrene, or acrylonitrile and styrene, especially preferably styrene. The monomers are optionally polymerized in the presence of further monomers, of a macromer and of a moderator, and using a free radical initiator, usually azo or peroxide compounds, in a polyesterol or polyetherol as the continuous phase. This process is described, for example in DE 111 394, U.S. Pat. No. 3,304,273, U.S. Pat. No. 3,383, 351, U.S. Pat. No. 3,523,093, DE 1 152 536 and DE 1 152 537.

During the free-radical polymerization, the macromers are also incorporated into the copolymer chain. This forms block copolymers with a polyester or polyether block and a polyacrylonitrile-styrene block, which act as phase mediators in the interface of continuous phase and dispersed phase, and suppress the agglomeration of the polymer polyesterol particles. The proportion of the macromers is typically 1 to 20% by weight, based on the total weight of the monomers used to prepare the polymer polyol.

When polymer polyol is present in the relatively high molecular weight compound b), it is preferably present together with further polyols, for example polyetherols, polyesterols or mixtures of polyetherols and polyesterols. The polymer polyols may be present, for example, based on the total weight of component (b), in an amount of 7 to 90% by weight, or of 11 to 80% by weight. The polymer polyol is more preferably polymer polyesterol or polymer polyetherol.

The relatively high molecular weight compounds b) may also comprise urea and polymer derivatives thereof in dispersed form.

The mean functionality of the compounds a2), a3) and b) is less than 2.4, preferably less than 2.3 and more preferably 1.7 to 2.2.

Additionally present in the production of polyurethane foams are blowing agents (c), comprising water. The blowing agents (c) used as well as water may additionally be commonly known chemically and/or physically active compounds. Chemical blowing agents are understood to mean compounds which form gaseous products by reaction with isocyanate, for example water or formic acid. Physical blowing agents are understood to mean compounds which are dissolved or emulsified in the feedstocks of the polyurethane preparation and evaporate under the conditions of polyurethane formation. These are for example, hydrocarbons, halogenated hydrocarbons, and other compounds, for example perfluorinated alkanes, such as perfluorohexane, hydrochlorofluorocarbons, and ethers, esters, ketones, acetals and inorganic and organic compounds, which release nitrogen on heating, or mixtures thereof, for example (cyclo)aliphatic hydrocarbons having 4 to 8 carbon atoms, or hydrofluorocarbons, such as Solkane® 365 mfc from Solvay Fluorides LLC. In a preferred embodiment, the blowing agent used is a mixture comprising at least one of these blowing agents and water, especially water as the sole blowing agent.

Blowing agent is used in such amounts that the density of the inventive polyurethane foam is 70 to 300 g/dm$^3$. When water is used as the sole blowing agent, the water content is typically within a range from 0.4 to 2% by weight, preferably 0.6 to 1.8% by weight, more preferably 0.8 to 1.5% by weight, based on the total weight of components (b) to (f).

The chain extenders (d) used are substances having a molecular weight of preferably less than 450 g/mol, more preferably of 60 to 400 g/mol, chain extenders having 2 hydrogen atoms reactive to isocyanates. These may be used individually or preferably in the form of mixtures. Preference is given to using diols having molecular weights less than 400, more preferably of 60 to 300 and especially 60 to 150. Useful examples include aliphatic, cycloaliphatic and/or araliphatic diols having 2 to 14 and preferably 2 to 10 carbon atoms, such as ethylene glycol, 1,3-propanediol, pentanediol, tripropylene glycol, 1,10-decanediol, 1,2-, 1,3-, 1,4-dihydroxycyclohexane, diethylene glycol, dipropylene glycol and preferably 1,4-butanediol, 1,6-hexanediol and bis(2-hydroxyethyl)hydroquinone, and low molecular weight hydroxyl-containing polyalkylene oxides based on ethylene oxide and/or 1,2-propylene oxide and the aforementioned diols as starter molecules. The chain extenders (d) used are more preferably monoethylene glycol, 1,4-butanediol, or mixtures thereof.

Optionally, it is also possible to use crosslinkers in addition to chain extenders. These are substances having a molecular weight of less than 450 g/mol and 3 hydrogen atoms reactive toward isocyanate, for example triols such as 1,2,4-, 1,3,5-trihydroxy-cyclohexane, glycerol and trimethylolpropane, or low molecular weight hydroxyl-containing polyalkylene oxides based on ethylene oxide and/or 1,2-propylene oxide and the aforementioned triols as starter molecules. In the second to fifth embodiments, preference is given to using no crosslinker.

When chain extenders (d) are employed, they are used appropriately in amounts of 1 to 60% by weight, preferably 1.5 to 50% by weight and especially 2 to 40% by weight, based on the weight of components (b) to (f).

The catalysts (e) used to produce the polyurethane foams are preferably compounds which significantly accelerate the reaction of the compounds comprising hydroxyl groups in components (b), (c) and, if appropriate, (d) with the compounds (a) having isocyanate groups. Examples include amidines such as 2,3-dimethyl-3,4,5,6-tetrahydropyrimidine, tertiary amines such as triethylamine, tributylamine, dimethylbenzylamine, N-methyl-, N-ethyl- and N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, tetramethyldiaminoethyl ether, urea, bis(dimethylaminopropyl) urea, dimethylpiperazine, 1,2-dimethylimidazole, 1-azabicyclo[3.3.0]octane and preferably 1,4-diazabicyclo [2.2.2]octane, and alkanolamine compounds such as triethanolamine, triisopropanolamine, N-methyl- and N-ethyldiethanolamine and dimethylethanolamine. Likewise useful are organometallic compounds, preferably organotin compounds such as tin(II) salts of organic carboxylic acids, e.g. tin(II) acetate, tin(II) octoate, tin(II) ethylhexoate and tin(II) laurate, and the dialkyltin(IV) salts of organic carboxylic acids, e.g. dibutyltin diacetates, dibutyltin dilaurate, dibutyltin maleate and dioctyltin diacetate, and also bismuth carboxylates such as bismuth(III) neodecanoate, bismuth 2-ethylhexanoate and bismuth octanoate, or mixtures thereof. The organometallic compounds may be used alone or preferably in combination with strongly basic amines. If component (b) is an ester, preference is given to using exclusively amine catalysts.

Preference is given to using 0.001 to 5% by weight, especially 0.05 to 2% by weight, of catalyst or catalyst combination, based on the weight of the component (b).

If appropriate, assistants and/or additives (f) may also be added to the reaction mixture for production of the polyurethane foams. Examples include surfactants, foam stabilizers, cell regulators, further release agents, fillers, dyes, pigments, hydrolysis stabilizers, odor absorbers and fungistats and/or bacteriostats.

Useful surfactants are, for example, compounds which serve to promote the homogenization of the starting materials and may also be suitable for regulating the cell structure. Examples include emulsifiers, such as the sodium salts of castor oil sulfates or of fatty acids, and salts of fatty acids with amines, for example diethylamine oleate, diethanolamine stearate, diethanolamine ricinoleate, salts of sulfonic acids, e.g. alkali metal or ammonium salts of dodecylbenzene- or dinaphthylmethanedisulfonic acid, and ricinoleic acid; foam stabilizers, such as siloxane-oxyalkylene copolymers and other organopolysiloxanes, ethoxylated alkylphenols, ethoxylated fatty alcohols, liquid paraffins, castor oil esters or ricinoleic esters, turkey red oil and peanut oil, and cell regulators, such as paraffins, fatty alcohols and dimethylpolysiloxanes. To improve the emulsifying effect or the cell structure and/or to stabilize the foam, oligomeric acrylates having polyoxyalkylene and fluoroalkane radicals as side groups are also suitable. The surfactants are typically used in amounts of 0.01 to 5 parts by weight, based on 100 parts by weight of the component (b).

Examples of suitable further release agents include: reaction products of fatty acid esters with polyisocyanates, salts of polysiloxanes comprising amino groups and of fatty acids, salts of saturated or unsaturated (cyclo)aliphatic carboxylic acids having at least 8 carbon atoms and tertiary amines, and especially internal release agents, such as carboxylic esters and/or carboxamides, prepared by esterification or amidation of a mixture of montanic acid and at least one aliphatic carboxylic acid having at least 10 carbon atoms with at least difunctional alkanolamines, polyols and/or polyamines having molecular weights from 60 to 400 g/mol, as disclosed, for example, in EP 153 639, mixtures of organic amines, metal salts of stearic acid and organic mono- and/or dicarboxylic acids or anhydrides thereof, as disclosed, for example, in DE-A-3 607 447, or mixtures of an imino compound, the metal salt of a carboxylic acid and optionally a carboxylic acid, as disclosed, for example, in U.S. Pat. No. 4,764,537. Inventive reaction mixtures preferably do not comprise any further release agents.

Fillers, especially reinforcing fillers, should be understood to mean the customary organic and inorganic fillers, reinforcing agents, loading agents, coating materials, etc. known per se. Specific examples include: inorganic fillers such as volcanic rock, silicate minerals, for example sheet silicates such as antigorite, bentonite, serpentine, hornblendes, amphiboles, chrysotile and talc, metal oxides such as kaolin, aluminas, titanium oxides, zinc oxide and iron oxides, metal salts such as chalk and barite, and inorganic pigments such as cadmium sulfide, zinc sulfide, and glass, etc. Preference is given to using kaolin (china clay), aluminum silicate and coprecipitates of barium sulfate and aluminum silicate, and natural and synthetic fibrous minerals such as wollastonite, metal fibers and in particular glass fibers of different lengths, which may have been sized. Examples of useful organic fillers include: carbon black, melamine, rosin, cyclopentadienyl resins and graft polymers, and also cellulose fibers, polyamide, polyacrylonitrile, polyurethane and polyester fibers based on aromatic and/or aliphatic dicarboxylic esters, and especially carbon fibers.

The inorganic and organic fillers may be used individually or as mixtures and are advantageously added to the reaction mixture in amounts of 0.5 to 50% by weight, preferably 1 to 40% by weight, based on the weight of components (a) to (c).

At the same time it is essential to the invention that certain conditions are observed for the particular embodiments of the process according to the invention.

In a first embodiment of the process according to the invention, in the production of the inventive open-cell polyurethane foams, at least one polyetherol and at least one polyesterol must be used in components a2), a3) and b). The polyetherol content in this case is greater than 5% by weight, preferably greater than 10% by weight to less than 95% by weight, more preferably greater than 12% by weight to less than 70% by weight and especially greater than 15 to less than 50% by weight, based on in each case on the total weight of components a2), a3) and b).

The compound having isocyanate groups used is preferably a polyisocyanate prepolymer based on polyetherol. The compound having isocyanate groups used is more preferably a mixture of a polyisocyanate prepolymer based on polyetherol and a polyisocyanate prepolymer based on polyesterol. The weight ratio of polyisocyanate prepolymer based on polyetherol and polyisocyanate prepolymer based on polyesterol is more preferably 35:65 to 70:30 and especially 40:60 to 60:40. In this case, as the relatively high molecular weight compound having groups reactive toward isocyanate (b), preference is given to using exclusively polyesterol or polymer polyesterol, particular preference to using exclusively polyesterol. Alternatively, it is also possible to use, as the relatively high molecular weight compound having groups reactive toward isocyanate (b), exclusively polyetherol when the polyisocyanate prepolymer used is a polyisocyanate prepolymer based on polyesters.

In a second embodiment of the process according to the invention, components a2) and b) comprise a mixture of polyester polyol and a high-functionality polyetherol having a functionality of at least 4 and a molecular weight of 5000 to 30 000 g/mol. The high-functionality polyetherol is preferably a polyoxypropylenepolyoxyethylenepolyol. The proportion of high-functionality polyetherol is preferably less than 20% by weight, more preferably from 15 to 0.5% by weight and especially from 10 to 1% by weight, based on the total weight of polyols a2), a3) and b). Component b) preferably comprises the high-functionality polyetherol.

In a third embodiment of the invention, the relatively high molecular weight compound b) used is a mixture of polyester polyol and a copolymer (C) having a functionality toward isocyanate of at least 4 and a molecular weight of 20 000 to 200 000 g/mol. The copolymer (C) is preferably formed from at least one $\alpha,\beta$-ethylenically unsaturated monomer and at least one unsaturated polyether polyol. These copolymers are liquid at 80° C.

In a preferred embodiment, the at least one α,β-ethylenically unsaturated monomer corresponds to the general formula (I)

in which
R$^1$ is C$_1$-C$_{30}$-alkyl, C$_2$-C$_{30}$-alkenyl, C$_2$-C$_{30}$-alkynyl, C$_1$-C$_{30}$-heteroalkyl, substituted or unsubstituted C$_5$-C$_{30}$-aryl, substituted or unsubstituted C$_5$-C$_{30}$-heteroaryl or functional groups selected from —(C=O)—O—R$^3$ or —(C=O)—NH—R$^4$ where R$^3$ and R$^4$ are selected from H, C$_1$-C$_{30}$-alkyl, C$_2$-C$_{30}$-alkenyl, C$_2$-C$_{30}$-alkinyl, C$_1$-C$_{30}$-heteroalkyl, substituted or unsubstituted C$_5$-C$_{30}$-aryl, and substituted or unsubstituted C$_5$-C$_{30}$-heteroaryl, and
R$^2$ is H, C$_2$-C$_{30}$-alkenyl, C$_2$-C$_{30}$-alkinyl, C$_1$-C$_{30}$-heteroalkyl, substituted or unsubstituted C$_5$-C$_{30}$-aryl or substituted or unsubstituted C$_5$-C$_{30}$-heteroaryl.

Preferably, in the general formula (I),
R$^1$ is substituted or unsubstituted C$_5$-C$_{30}$-aryl, for example benzyl or naphthyl, substituted or unsubstituted C$_5$-C$_{30}$-heteroaryl or functional groups selected from —(C=O)—O—R$^3$ and —(C=O)—NH—R$^4$ where R$^3$ and R$^4$ are selected from C$_1$-C$_{30}$-alkyl, especially C$_{12}$-C$_{30}$-alkyl, or C$_2$-C$_{30}$-alkenyl, especially C$_{12}$-C$_{30}$-alkenyl and
R$^2$ is H, C$_1$-C$_{12}$-alkyl, for example methyl, ethyl, propyl, butyl.

Heteroatoms are, for example selected from N, O, P, S.

In a very particularly preferred embodiment, the α,β-ethylenically unsaturated monomer is selected from the group consisting of styrene, α-methylstyrene, acrylonitrile, acrylates, acrylic esters or methacrylic esters or acrylamides or methacrylamides of saturated fatty acids, for example lauric acid C$_{11}$H$_{23}$COOH, tridecanoic acid C$_{12}$H$_{25}$COOH, myristic acid C$_{13}$H$_{27}$COOH, pentadecanoic acid C$_{14}$H$_{29}$COOH, palmitic acid C$_{15}$H$_{31}$COOH, margaric acid C$_{16}$H$_{33}$COOH, stearic acid C$_{17}$H$_{35}$COOH, nonadecanoic acid C$_{18}$H$_{37}$COOH, arachic acid C$_{19}$H$_{39}$COOH, behenic acid C$_{21}$H$_{41}$COOH, lignoceric acid C$_{23}$H$_{47}$COOH, cerotic acid C$_{25}$H$_{51}$COOH, melissic acid C$_{29}$H$_{59}$COOH, tuberculostearic acid i-C$_{18}$H$_{37}$COOH, or unsaturated fatty acids, for example palmitoleic acid C$_{15}$H$_{29}$COOH, oleic acid C$_{17}$H$_{33}$COOH, erucic acid C$_{21}$H$_{41}$COOH, linoleic acid C$_{17}$H$_{31}$COOH, linolenic acid C$_{17}$H$_{29}$COOH, eleostearic acid C$_{17}$H$_{29}$COOH, arachidonic acid C$_{19}$H$_{31}$COOH, clupanodonic acid C$_{21}$H$_{33}$COOH, docosahexaenoic acid C$_{21}$H$_{31}$COOH, and mixtures thereof.

In a preferred embodiment, the unsaturated polyether polyol present in the copolymer (C) is an unsaturated polyaddition product of at least one polyhydric alcohol, for example sugars, such as hydrolyzed starch, glucose syrup, sorbitol, sucrose, pentaerythritol, dipentaerythritol, tripentaerythritol, glycerol, trimethylolpropane, a polyfunctional amine, for example ethylenediamine, diethylenetriamine, 1,3-propylenediamine, 1,3-butylenediamine, 1,4-butylenediamine, 1,2-, 1,4-, 1,5- and 1,6-hexamethylenediamine, phenylenediamine, 2,3-, 2,4- and 2,6-tolylenediamine, vicinal tolylenediamines, 4,4'-, 2,4'- and 2,2'-diaminodiphenylmethane, alkanolamine, such as ethanolamine, N-methyl- and N-ethylethanolamine, diethanolamine, N-methyl-, N-ethyldiethanolamine, triethanolamine, ammonia, condensates of acetone or formaldehyde with phenol or polyfunctional alcohols, derived from polymers formed from hydroxy-functional monomers, such as polymers of hydroxyethyl acrylate, hydroxymethyl acrylate, hydroxyethyl methacrylate, hydroxymethyl methacrylate, hydroxypropyl acrylate, hydroxypropyl methacrylate or copolymers of these monomers, at least one alkylene oxide, for example ethylene oxide, propylene oxide, butylene oxide and/or pentylene oxide, and at least one unsaturated monomer, for example styrene or α-methylstyrene substituted by at least one isocyanate group, especially meta-isopropenylbenzyl isocyanate, for example acrylic acid, acryloyl chloride, methacrylic acid, methacryloyl chloride, fumaric acid, maleic anhydride, vinylically unsaturated epoxides, for example acryloyl glycidyl ether, methacryloyl glycidyl ether.

Very particularly preferred copolymers (C) are, for example, copolymers of butyl acrylate, styrene, an unsaturated polyether polyol formed from sorbitol, propylene oxide, ethylene oxide and meta-isopropenylbenzyl isocyanate (mass ratio 1:1:1), copolymers of butyl acrylate, styrene, an unsaturated polyether polyol formed from sorbitol, propylene oxide, ethylene oxide and meta-isopropenylbenzyl isocyanate (mass ratio 1:2:1), copolymers of butyl acrylate, styrene, an unsaturated polyether polyol formed from sorbitol, propylene oxide, ethylene oxide and meta-isopropenylbenzyl isocyanate (mass ratio 2:2:1), copolymers of butyl acrylate, styrene, an unsaturated polyether polyol formed from sorbitol, propylene oxide, ethylene oxide and meta-isopropenylbenzyl isocyanate (mass ratio 4:4:1), copolymers of butyl acrylate, styrene, an unsaturated polyether polyol formed from sorbitol, propylene oxide, ethylene oxide and meta-isopropenylbenzyl isocyanate (mass ratio 4:4:1), copolymers of butyl acrylate, styrene, an unsaturated polyether polyol formed from sorbitol, propylene oxide, ethylene oxide and meta-isopropenylbenzyl isocyanate (mass ratio 4:4:1) with relatively low molecular weight, copolymers of styrene, an unsaturated polyether polyol formed from sorbitol, propylene oxide, ethylene oxide and meta-isopropenylbenzyl isocyanate (mass ratio 8:1) copolymers of butyl acrylate, styrene, an unsaturated polyether polyol formed from sorbitol, propylene oxide, ethylene oxide and meta-isopropenylbenzyl isocyanate (mass ratio 8:8:1) with relatively low molecular weight, copolymers of styrene, stearyl acrylate, an unsaturated polyether polyol formed from sorbitol, propylene oxide, ethylene oxide and meta-isopropenylbenzyl isocyanate (mass ratio 1:1:1), copolymers of stearyl acrylate, an unsaturated polyether polyol formed from sorbitol, propylene oxide, ethylene oxide and meta-isopropenylbenzyl isocyanate (mass ratio 1:1:1), copolymers of butyl acrylate, stearyl acrylate, an unsaturated polyether polyol formed from sorbitol, propylene oxide, ethylene oxide and meta-isopropenylbenzyl isocyanate (mass ratio 1:1:1), copolymers of stearyl acrylate, hydroxyethyl acrylate, an unsaturated polyether polyol formed from hydroxyethyl acrylate, diisocyanate and polyether polyol, copolymers of stearyl acrylate, hydroxypropyl acrylate, an unsaturated polyether polyol formed from hydroxyethyl acrylate, diisocyanate and polyether polyol, copolymers of stearyl acrylate, styrene and an unsaturated polyether polyol formed from hydroxyethyl acrylate, diisocyanate and polyether polyol, copolymers of stearyl acrylate, acrylonitrile and an unsaturated polyether polyol formed from hydroxyethyl acrylate, diisocyanate and polyether polyol, copolymers of unsaturated fatty alcohol (C$_{12}$-C$_{30}$) formed from fatty alcohol (C$_{12}$-C$_{30}$) and meta-isopropenylbenzyl isocyanate, an unsaturated polyether polyol formed from hydroxyethyl acrylate, diisocyanate and polyether polyol, copolymers of unsaturated fatty alcohol (C$_{12}$-C$_{30}$) formed from fatty alcohol (C$_{12}$-C$_{30}$) and meta-isopropenylbenzyl isocyanate, styrene, an unsaturated polyether polyol formed from hydroxyethyl acrylate, diisocyanate and polyether polyol, copolymers of unsaturated fatty alcohol ($C_{12}$-$C_{30}$) formed from fatty alcohol ($C_{12}$-$C_{30}$) and meta-isopropenylbenzyl isocyanate, acrylonitrile, an unsaturated polyether polyol formed from hydroxyethyl acrylate, diisocyanate and polyether polyol, copolymers of unsaturated fatty alcohol ($C_{12}$-$C_{30}$) formed from fatty alcohol ($C_{12}$-$C_{30}$) and meta-isopropenylbenzyl isocyanate, an unsaturated polyether polyol formed from meta-isopropenylbenzyl isocyanate and polyether polyol, copolymers of unsaturated fatty alcohol ($C_{12}$-$C_{30}$) formed from fatty alcohol ($C_{12}$-$C_{30}$) and meta-isopropenylbenzyl isocyanate, styrene, an unsaturated polyether polyol formed from meta-isopropenylbenzyl isocyanate and polyether polyol.

Especially preferred are copolymers of styrene, stearyl acrylate and an unsaturated polyether polyol formed from sorbitol, propylene oxide, ethylene oxide and meta-isopropenylbenzyl isocyanate. Preferred unsaturated polyetherols have a functionality of 2 to 8 and a molecular weight Mw of 2000 g/mol to 50 000 g/mol.

These polymers suitable as copolymers (C) in accordance with the invention preferably have a molecular weight in the range from 10 000 to 1 000 000 g/mol, more preferably from 20 000 to 200 000, especially from 30 000 to 80 000 g/mol. The molecular weights are typically determined by means of GPC; the standard used is polystyrene.

The proportion of the amphiphilic molecule is preferably 0.1 to 20% by weight, more preferably 0.2 to 10% by weight and especially 0.5 to 5% by weight, based on the total weight of compounds a2), a3) and b).

In a fourth embodiment, the relatively high molecular weight compound b) used is a mixture of polyester polyol and a hydrophobic hyperbranched polyester. An inventive hyperbranched polyester is obtainable by reacting at least one dicarboxylic acid ($A_2$) or derivatives thereof with s1) at least one at least trihydric alcohol ($B_3$), or
t1) at least one dihydric alcohol ($B_2$) and at least one x-hydric alcohol ($C_x$) which has more than two OH groups where x is greater than 2, where the overall mixture of the alcohols used has a mean functionality of 2.1 to 10, or by reacting at least one polycarboxylic acid ($D_y$) or derivative thereof which has more than two acid groups where y is greater than 2, with s2) at least one at least dihydric alcohol ($B_2$), or
t2) at least one dihydric alcohol ($B_2$) and at least one x-hydric alcohol ($C_x$) which has more than two OH groups where x is greater than 2, where
u) up to 50 mol %, preferably up to 40 mol %, more preferably up to 30 mol %, and especially preferably up to 20 mol %, based on the alcohols $B_3$, $B_2$ and/or $C_x$ converted according to s1), s2), t1) and t2), of a hydrophobic, long-chain monofunctional alcohol $E_1$ having at least 8 carbon atoms may also be reacted, and
v) optional subsequent reaction with a long-chain hydrophobic monocarboxylic acid having at least 8 carbon atoms, where one or more of the following conditions are met:
i) the alcohol $B_3$ or $B_2$ and/or $C_x$ is a hydrophobic alkoxylate based on propylene oxide, butylene oxide or styrene oxide and having an average of at least 1 and at most 100 oxyalkylene units per starter molecule, and a difunctional (for $B_2$), trifunctional (for $B_3$) or x-functional (for $C_x$) starter molecule;
ii) the alcohols $B_3$ or $B_2$ and/or $C_x$ comprise at least 20 mol %, preferably at least 30 mol %, more preferably at least 40 mol %, and most preferably at least 50 mol % of a long-chain diol or polyol having at least 8 carbon atoms;
iii) the dicarboxylic acid is a hydrophobic long-chain aliphatic dicarboxylic acid, an aromatic or cycloaliphatic dicarboxylic acid having at least 8 carbon atoms, or the carboxylic acid $D_y$ having more than two acid groups is a hydrophobic long-chain aliphatic polycarboxylic acid, or an aromatic or cycloaliphatic polycarboxylic acid having at least 9 carbon atoms;
iv) at least 10 mol % and at most 90 mol %, preferably at most 70 mol %, more preferably at most 50 mol %, and especially preferably at most 30 mol %, based on the alcohols $B_3$, $B_2$ and/or $C_x$ converted according to s1), s2), t1) and t2) of a long-chain monoalcohol having at least 8 carbon atoms are also reacted;
v) there is subsequent reaction with 10 to 100 mol %, preferably 10 to 80 mol %, more preferably 20 to 80 mol %, and especially preferably 20 to 60 mol %, based on the mean number of OH groups of the hyperbranched polyester, of a long-chain hydrophobic monocarboxylic acid having at least 8 carbon atoms.

For the purposes of the present invention, "hyperbranched" means that the degree of branching (DB) is from 10 to 100%, preferably from 10 to 99.9%, more preferably 20 to 99%, especially 20 to 95%. The term also comprises dendrimers having 100% degree of branching. For the definition of "degree of branching", see H. Frey et al., Acta Polym. 1997, 48, 30.

A polyester of the $A_xB_y$ type is a condensate of the molecules A and B where the molecules A have functional groups funkt1) and the molecules B have functional groups funkt2), and these are capable of condensation reactions with one another. The functionality of the molecules A here is equal to x, and the functionality of the molecules B here is equal to y. By way of example, mention may be made of a polyester formed from adipic acid as molecule A (funkt1=COOH, x=2) and glycerol as molecule B (funkt2=OH; y=3).

It is possible, of course, that the units A and B used also comprise mixtures of different molecules A having the same functional group and having the same and/or different functionalities, and of different molecules B having the same functional group and having the same and/or different functionalities. The functionalities x and y of the mixture are then obtained by averaging.

The ratio of the reactive groups in the reaction mixture is generally selected in such a way that the resultant molar ratio of OH groups to carboxyl groups or derivatives of these is from 5:1 to 1:5, preferably from 4:1 to 1:4, more preferably from 3:1 to 1:3, more preferably from 2.5:1 to 1:2.5, and most preferably from 2:1 to 1:2.

In another particularly preferred embodiment, within the reaction mixture, one of the two components, the carboxylic acid component used for synthesizing the hyperbranched polymer, or the alcohol component, is used in molar excess. The result is formation of particularly preferred, predominantly COOH-terminated or predominantly OH-terminated, hyperbranched polyesters. Advantageous molar excess ratios of the COOH groups with respect to the OH groups, or excesses of the OH groups with respect to the COOH groups, have been found to be from 1.1:1 to 3:1, preferably from 1.3:1 to 2.8:1, preferably from 1.5:1 to 2.6:1, more preferably from 1.7:1 to 2.4:1, very preferably from 1.8:1 to 2.2:1, and especially preferably from 1.9:1 to 2.1:1.

If appropriate, operations are carried out in the presence of a solvent and optionally in the presence of an inorganic, organometallic, or low molecular weight organic catalyst or of an enzyme. The most inexpensive production method, which is therefore preferred, is that of reaction in bulk, i.e. without solvent. The catalysts used are the usual catalysts known to the person skilled in the art for the esterification reaction, for example those described by way of example in WO 2008/071622.

For the purposes of the present invention, hyperbranched polyesters have molecular and structural nonuniformity. They differ from dendrimers in having molecular nonuniformity and are therefore considerably less expensive to produce.

Examples of suitable hydrophobic long-chain dicarboxylic acids having 8 or more carbon atoms are suberic acid (octanedioic acid), azelaic acid, sebacic acid (decanedioic acid), dodecanedioic acid, and tetradecanedioic acid. The long-chain dicarboxylic acids include especially those having long-chain alkyl or alkenyl substituents, an example being alkenylsuccinic acid having a C8-C24-alkenyl radical, preferably C12-C18-alkenyl radical.

The long-chain dicarboxylic acids include especially α,β-unsaturated carboxylic acids or derivatives thereof hydrophobized by addition of hydrophobic radicals onto the carbon-carbon double bond. The α,β-unsaturated carboxylic acids and derivatives thereof used here preferably comprise maleic acid, maleic anhydride, and fumaric acid, more preferably maleic anhydride. The hydrophobization may follow or preferably precede the reaction with the alcohol to give the polyester. The hydrophobing agents used may be hydrophobic compounds comprising at least one carbon-carbon double bond, e.g. linear or branched olefins, linear or branched polyisobutylene, polybutadiene, or polyisoprene having an average of 8 to 160 carbon atoms.

The long-chain dicarboxylic acids also include unsaturated fatty acids and derivatives thereof, and also dimerized fatty acids (e.g. oleic acid dimerized by way of the olefinic unit).

Examples of suitable cycloaliphatic dicarboxylic acids are cis- and trans-cyclohexane-1,2-dicarboxylic acid, cis- and trans-cyclohexane-1,3-dicarboxylic acid, and cis- and trans-cyclohexane-1,4-dicarboxylic acid, where the abovementioned dicarboxylic acids can have substitution.

Examples of suitable aromatic dicarboxylic acids are phthalic acid, isophthalic acid, and terephthalic acid.

It is also possible to use any mixture of two or more of the above-mentioned representatives.

The dicarboxylic acids can be used either as they stand or in the form of their derivatives.

Derivatives are preferably understood to mean the relevant anhydrides in monomeric or else polymeric form, mono- or dialkyl esters, preferably mono- or dimethyl esters, or the corresponding mono- or diethyl esters, or else the mono- and dialkyl esters derived from higher alcohols, e.g. n-propanol, isopropanol, n-butanol, isobutanol, tert-butanol, n-pentanol, n-hexanol, and also mono- and divinyl esters, and also mixed esters, preferably methyl ethyl esters.

It is also possible to use a mixture of a dicarboxylic acid with one or more derivatives thereof. It is equally possible to use a mixture of a plurality of different derivatives of one or more dicarboxylic acids.

Examples of tricarboxylic acids or polycarboxylic acids ($D_y$) that can be reacted are aconitic acid, 1,3,5-cyclohexanetricarboxylic acid, 1,2,4-benzenetricarboxylic acid, 1,3,5-benzenetricarboxylic acid, 1,2,4,5-benzenetetracarboxylic acid (pyromellitic acid), and also mellitic acid and low-molecular-weight polyacrylic acids.

Tricarboxylic acids or polycarboxylic acids ($D_y$) can be used either as they stand or else in the form of derivatives.

It is also possible to use a mixture of a tri- or polycarboxylic acid with one or more derivatives thereof, for example a mixture of pyromellitic acid and pyromellitic dianhydride. It is equally possible to use a mixture of a plurality of different derivatives of one or more tri- or polycarboxylic acids, for example a mixture of 1,3,5-cyclohexanetricarboxylic acid and pyromellitic dianhydride.

Tricarboxylic acids or polycarboxylic acids can be used in the reaction of the invention either as they stand or else in the form of derivatives.

It is also possible to use a mixture of a tri- or polycarboxylic acid with one or more derivatives thereof. It is equally possible for the purposes of the present invention to use a mixture of a plurality of different derivatives of one or more tri- or polycarboxylic acids to obtain the hyperbranched polyester.

Examples of diols ($B_2$) used are ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol 1,7-heptanediol, 1,8-octanediol, 1,2-octanediol, 1,9-nonanediol, 1,2-decanediol, 1,10-decanediol, 1,2-dodecanediol, 1,12-dodecanediol, 1,5-hexadiene-3,4-diol, 1,2- and 1,3-cyclopentanediols, 1,2-, 1,3-, and 1,4-cyclohexanediols, 1,1-, 1,2-, 1,3-, and 1,4-bis(hydroxymethyl)cyclohexanes, 1,1-, 1,2-, 1,3-, and 1,4-bis(hydroxyethyl)cyclohexanes, neopentyl glycol, (2)-methyl-2,4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, dipropylene glycol, tripropylene glycol, polyethylene glycols $HO(CH_2CH_2O)_n$—H, or polypropylene glycols $HO(CH[CH_3]CH_2O)_n$—H, where n is a whole number and n 4, polyethylene polypropylene glycols, where the sequence of the ethylene oxide units or of the propylene oxide units can be of block or random type, polytetramethylene glycols, preferably up to a molar mass of 5000 g/mol, poly-1,3-propanediols, preferably having a molar mass of up to 5000 g/mol, polycaprolactones, or a mixture of two or more representatives of the above compounds. One or else both of the hydroxy groups in the abovementioned diols can be replaced by SH groups. Diols whose use is preferred are ethylene glycol, 1,2-propanediol, 1,3-propanediol, 1,4-butanediol, 1,5-pentanediol, 1,6-hexanediol, 1,8-octanediol, 1,2-, 1,3-, and 1,4-cyclohexanediol, 1,3- and 1,4-bis(hydroxymethyl)-cyclohexane, and also diethylene glycol, triethylene glycol, dipropylene glycol, tripropylene glycol, polyethylene glycols $HO(CH_2CH_2O)_n$—H, or polypropylene glycols $HO(CH[CH_3]CH_2O)_n$—H, where n is a whole number and n 4, polyethylene polypropylene glycols, where the sequence of the ethylene oxide units and of the propylene oxide units can be of block or random type, or polytetramethylene glycols, preferably up to a molar mass of 5000 g/mol.

The dihydric alcohols $B_2$ may optionally also comprise further functionalities, e.g. carbonyl, carboxyl, alkoxycarbonyl, or sulfonyl functions, examples being dimethylolpropionic acid or dimethylolbutyric acid, and also $C_1$-$C_4$-alkyl esters thereof, glycerol monostearate, or glycerol monooleate.

Examples of suitable long-chain diols $B_2$ having at least 8 carbon atoms are 1,8-octanediol, 1,2-octanediol, 1,9-nonanediol, 1,2-decanediol, 1,10-decanediol, 1,2-dodecanediol, 1,12-dodecanediol, and also monofatty acid esters of triols, especially monofatty acid esters of glycerol, e.g. glycerol monostearate, glycerol monooleate, and glycerol monopalmitate.

At least trifunctional alcohols ($B_3$ and $C_x$) comprise glycerol, trimethylolmethane, trimethylolethane, trimethylolpropane, 1,2,4-butanetriol, tris(hydroxymethyl)amine, tris(hydroxyethyl)amine, tris(hydroxypropyl)amine, pentaerythritol, diglycerol, triglycerol, and higher condensation products of glycerol, di(trimethylolpropane), di(pentaerythritol), trishydroxymethyl isocyanurate, tris(hydroxyethyl) isocyanurate (THEIC), tris(hydroxypropyl) isocyanurate, inositols, sugars, e.g. glucose, fructose, or sucrose, sugar alcohols, e.g. sorbitol, mannitol, threitol, erythritol, adonitol (ribitol), arabitol (lyxitol), xylitol, dulcitol (galactitol), maltitol, isomalt, and trifunctional or higher-functionality polyetherols based on trifunctional or higher-functionality alcohols and propylene oxide and/or butylene oxide.

Particular preference is given here to glycerol, diglycerol, triglycerol, trimethylolethane, trimethylolpropane, bis(trimethylolpropane), 1,2,4-butanetriol, pentaerythritol, di(pentaerythritol), tris(hydroxyethyl) isocyanurate, and also polyetherols of these based on propylene oxide.

The at least trifunctional alcohols $B_3$ may optionally also comprise further functionalities, e.g. carbonyl functions, carboxyl functions, alkoxycarbonyl functions, or sulfonyl functions, examples being gallic acid and its derivatives.

Examples of suitable hydrophobic long-chain aliphatic monocarboxylic acids F are octanoic acid, decanoic acid, dodecanoic acid, tetradecanoic acid, and fatty acids, such as stearic acid, oleic acid, lauric acid, palmitic acid, linoleic acid, and linolenic acid.

In one embodiment i) of the invention, the alcohol $B_3$ or $B_2$, and/or $C_x$, is a hydrophobic alkoxylate based on propylene oxide or butylene oxide and having an average of at least 1 and at most 100 oxyalkylene units per starter molecule, preferably at most 50 oxyalkylene units per starter molecule. Preferred alcohols $B_3$ and $B_2$, and/or $C_x$, are the propoxylates of monoethylene glycol, diethylene glycol, propylene glycol, dipropylene glycol, tripropylene glycol, glycerol, trimethylolpropane, pentaerythritol, sorbitol, or sucrose, which have an average of 1 to 30 oxypropylene units per OH group, especially 1 to 20 oxypropylene units per OH group.

In another embodiment ii) of the invention, the alcohols $B_3$ and $B_2$, and/or $C_x$, comprise at least 20 mol %, preferably at least 30 mol %, especially 40 mol %, and very particularly at least 50 mol %, of a long-chain diol or polyol having at least 8 carbon atoms, preferably having at least 10 carbon atoms, more preferably having at least 12 carbon atoms. Particularly preferred diols or polyols having at least 8 carbon atoms are isomers of octanediol, of nonanediol, of decanediol, of dodecanediol, of tetradecanediol, of hexadecanediol, of octadecanediol, of dimethylolcyclohexane, and of dimethylolbenzene.

In another embodiment iii) of the invention, the dicarboxylic acid is a hydrophobic long-chain aliphatic dicarboxylic acid, or an aromatic or cycloaliphatic dicarboxylic acid having at least 8 carbon atoms. It is preferable to react aliphatic long-chain dicarboxylic acids. These preferably have at least 10, especially at least 12, carbon atoms. They generally have at most 100 carbon atoms, preferably at most 50 carbon atoms. Alongside these, it is possible also to use relatively short-chain dicarboxylic acids in amounts of up to 90 mol %, preferably amounts of up to 70 mol %, more preferably amounts of up to 50 mol %, based on the total amount of the dicarboxylic acids.

Preferred long-chain aliphatic dicarboxylic acids are suberic acid (octanedioic acid), azelaic acid, sebacic acid (decanedioic acid), dodecanedioic acid, and tetradecanedioic acid; alkenylsuccinic acid, especially having a C8-C24-alkenyl radical, preferably those having a C12-C18-alkenyl radical, and especially preferably having a C16-C18-alkenyl radical, even further preference being given to the even-numbered alkenyl radicals over odd-numbered alkenyl radicals; adducts of linear or branched polyisobutylene, polybutadiene, polyisoprene having an average of 8 to 160 carbon atoms onto α,β-unsaturatedcarboxylic acids, especially maleic acid or fumaric acid; fatty acids or derivatives of these, and dimerized fatty acids.

Preferred polycarboxylic acids $D_y$ having more than two acid groups are hydrophobic long-chain, and also cyclic, aliphatic, and aromatic polycarboxylic acids. Particular preference is given to aconitic acid, and also to isomers of cyclohexanetricarboxylic acid, of benzenetricarboxylic acid, and to oligomeric polyacrylic acids having at least 3 and at most 10 acid groups.

In another embodiment iv) of the invention, the reaction includes at least 10 mol % and at most 90 mol %, preferably at most 70 mol %, more preferably at most 50 mol %, and especially preferably at most 30 mol %, based on the alcohols $B_3$, $B_2$, and/or $C_x$ converted according to s1), s2), t1), and t2), of a long-chain monoalcohol having at least 8 carbon atoms, preferably at least 10 carbon atoms. Preferred long-chain monoalcohols are octanol, decanol, dodecanol, tetradecanol, C16 alcohols, and C18 alcohols.

In another embodiment v) of the invention, the reaction product obtained from components s1) and t1), or s2) and t2), is then reacted with 10 to 100 mol %, preferably 20 to 100 mol %, more preferably 20 to 80 mol %, especially preferably 20 to 60 mol %, based on the mean number of OH groups of the hyperbranched polyester, of a long-chain hydrophobic monocarboxylic acid having at least 8 carbon atoms, preferably at least 10 carbon atoms, especially having at least 12 carbon atoms. Preferred long-chain monocarboxylic acids are octanoic acid, decanoic acid, dodecanoic acid, tetradecanoic acid, and fatty acids, such as stearic acid and oleic acid.

Especially preferred hydrophobic hyperbranched polyesters are obtained when i) the alcohol $B_3$ or $B_2$ and/or $C_x$ is a hydrophobic alkoxylate based on propylene oxide or butylene oxide and having an average of 1 to 15 oxyalkylene units per OH group, and iii) the latter is reacted with a hydrophobic long-chain aliphatic dicarboxylic acid, an aromatic or cycloaliphatic dicarboxylic acid having at least 8 carbon atoms, especially of a long-chain aliphatic dicarboxylic acid having at least 8 carbon atoms, or with a hydrophobic long-chain aliphatic polycarboxylic acid, or an aromatic or cycloaliphatic polycarboxylic acid $D_y$ having more than two acid groups and at least 9 carbon atoms, or i) the alcohol $B_3$ or $B_2$ and/or $C_x$ is a hydrophobic alkoxylate based on propylene oxide or butylene oxide and having an average of 1 to 15 oxyalkylene units per OH group, and iii) the latter is reacted with a hydrophobic long-chain aliphatic dicarboxylic acid, an aromatic or cycloaliphatic dicarboxylic acid having at least 8 carbon atoms, especially of a long-chain aliphatic dicarboxylic acid having at least 8 carbon atoms, or with a hydrophobic long-chain aliphatic polycarboxylic acid, or an aromatic or cycloaliphatic polycarboxylic acid $D_y$ having more than two acid groups and at least 9 carbon atoms, where one of the two components, the carboxylic acid component or the alcohol component, within the reaction mixture for synthesizing the hyperbranched polyester, is used in molar excess, and the molar excess ratio of the COOH groups with respect to the OH groups or the excess of the OH groups with respect to the COOH groups is from 1.1:1 to 3:1, preferably from 1.3:1 to 2.8:1, preferably from 1.5:1 to 2.6:1, more preferably from 1.7:1 to 2.4:1, very preferably from 1.8:1 to 2.2:1, and especially preferably 1.9:1 to 2.1:1, and in particular the carboxylic acid component is used in a molar excess and the molar excess ratio of the COOH groups with respect to the OH groups is from 1.1:1 to 3:1, preferably from 1.3:1 to 2.8:1, preferably from 1.5:1 to 2.6:1, more preferably from 1.7:1 to 2.4:1, very preferably from 1.8:1 to 2.2:1, and especially preferably from 1.9:1 to 2.1:1,
or
i) the alcohol $B_3$ or $B_2$ and/or $C_x$ is a hydrophobic alkoxylate based on propylene oxide or butylene oxide and having an average of 1 to 15 oxyalkylene units per OH group, and
iv) at least 10 mol % and at most 90 mol %, preferably at most 70 mol %, more preferably at most 50%, and especially preferably at most 30 mol %, based on the alcohols $B_3$, $B_2$ and/or $C_x$ converted according to s1), s2), t1) and t2) of a long-chain monoalcohol having at least 8 carbon atoms are also reacted,
or
i) the alcohol $B_3$ or $B_2$ and/or $C_x$ is a hydrophobic alkoxylate based on propylene oxide or butylene oxide and having an average of 1 to 15 oxyalkylene units per OH group, and
v) then the reaction product formed from s1) and t1) or s2) and t2) is reacted with 10 to 100 mol %, preferably 20 to 100 mol %, more preferably 20 to 80 mol %, especially preferably 20 to 60 mol %, based on the mean number of OH groups of the hyperbranched polyester, of a long-chain hydrophobic monocarboxylic acid having at least 8 carbon atoms.

The hydrophobic hyperbranched polyester used in accordance with the invention generally has a number-average molecular weight $M_n$ of 800 to 15 000, preferably from 1000 to 12 000 and especially from 1500 to 10 000 g/mol, measured by GPC, calibrated with a polymethyl methacrylate (PMMA) standard.

In general, the hydrophobic hyperbranched polyester used in accordance with the invention has an OH number of 0 to 500, preferably of 0 to 400, and especially of 0 to 300 mg KOH/g of polyester to DIN 53240.

In general, the hydrophobic hyperbranched polyesters used in accordance with the invention have an acid number to DIN 53240, part 2 of 0 to 300, preferably of 0 to 200, preferably of 1 to 150, more preferably of 1 to 125, preferably of 5 to 125 and especially of 10 to 125 mg KOH/g.

In addition, the hydrophobic hyperbranched polyesters used in accordance with the invention generally have a glass transition temperature (measured to ASTM method D3418-03 with DSC) of −60 to 100° C., preferably of −40 to 80° C.

The preparation of the hydrophobic hyperbranched polyesters, is preferably performed without solvent or in the presence of a solvent. Suitable examples are hydrocarbons such as paraffins or aromatics. Particularly suitable paraffins are n-heptane and cyclohexane. Particularly suitable aromatics are toluene, ortho-xylene, meta-xylene, para-xylene, xylene as an isomer mixture, ethylbenzene, chlorobenzene and ortho- and metadichlorobenzene. Further very particularly suitable solvents in the absence of acidic catalysts are: ethers, for example dioxane or tetrahydrofuran and ketones, for example methyl ethyl ketone and methyl isobutyl ketone.

The amount of solvent added is, unless working entirely without solvent, in accordance with the invention at least 0.1% by weight, based on the mass of the starting materials which have been used and are to be converted, preferably at least 1% by weight and more preferably at least 10% by weight. It is also possible to use excesses of solvent, based on the mass of starting materials which have been used and are to be converted, for example a 1.01- to 10-fold excess. Amounts of solvent of more than 100 times the mass of starting materials which have been used and are to be converted are not advantageous because the reaction rate declines significantly at significantly lower concentrations of the reactants, which leads to uneconomically long reaction times.

To perform the process, it is possible to work in the presence of a water-withdrawing agent as an additive, which is added at the start of the reaction. Suitable examples are molecular sieves, especially 4 Å molecular sieve, $MgSO_4$ and $Na_2SO_4$. It is also possible to add further water-withdrawing agent during the reaction or to replace water-withdrawing agent with fresh water-withdrawing agent.

It is also possible to distill off water or alcohol formed during the reaction and, for example, to use a water separator.

The process can be performed in the absence of acidic catalysts. Preference is given to working in the presence of an acidic inorganic, organometallic or organic catalyst, or mixtures of a plurality of acidic inorganic, organometallic or organic catalysts.

For the purposes of the present invention, examples of acidic inorganic catalysts include sulfuric acid, phosphoric acid, phosphonic acid, hypophosphorous acid, aluminum sulfate hydrate, alum, acidic silica gel (pH=6, especially=5) and acidic alumina. Examples of further useable acidic inorganic catalysts are aluminum compounds of the general formula $Al(OR)_3$ and titanates of the general formula $Ti(OR)_4$, where the R radicals may each be the same or different and are each independently selected from The R radicals in $Al(OR)_3$ and $Ti(OR)_4$ are preferably each the same and are selected from isopropyl and 2-ethylhexyl.

Preferred acidic organometallic catalysts are, for example, selected from dialkyltin oxides R2SnO, where R is as defined above. A particularly preferred representative of acidic organometallic catalysts is di-n-butyltin oxide, which is commercially available in the form of oxo-tin, or di-n-butyltin dilaurate.

Preferred acidic organic catalysts are acidic organic compounds having, for example, phosphate groups, sulfo groups, sulfate groups or phospho groups. Particular preference is given to sulfonic acids, for example para-toluenesulfonic acid. It is also possible to use acidic ion exchangers as acidic organic catalysts, for example sulfo-containing polystyrene resins, which have been crosslinked with about 2 mol % of divinylbenzene.

It is also possible to use combinations of two or more of the aforementioned catalysts. It is also possible to use those organic or organometallic or else inorganic catalysts present in the form of discrete molecules in immobilized form.

If the use of inorganic, organometallic or organic catalysts is desired, in accordance with the invention 0.1 to 10% by weight, preferably 0.2 to 2% by weight, of catalyst is used.

The process for preparing the hyperbranched polyesters is performed under an inert gas atmosphere, i.e. for example, under carbon dioxide, nitrogen or noble gas, among which particular mention should be made of argon.

The process for preparing the hyperbranched polyesters is performed at temperatures of 60 to 200° C. Preference is given to working at temperatures of 130 to 180° C., especially to 150° C. or lower. Particular preference is given to maximum temperatures up to 145° C., most preferably up to 135° C.

It is possible to work under significantly reduced pressure, for example at 10 to 500 mbar. The process for preparing the hyperbranched polyesters can also be performed at pressures above 500 mbar. For reasons of simplicity, preference is given to reaction at atmospheric pressure; however, performance at slightly elevated pressure is also possible, for example up to 1200 mbar. It is also possible to work under significantly elevated pressure, for example at pressures up to 10 bar. Preference is given to reaction at atmospheric pressure.

The reaction time of the process according to the invention is typically 10 minutes to 24 hours, preferably 30 minutes to 18 hours, more preferably 1 to 16 hours, and especially preferably 4 to 12 hours.

Once the reaction to prepare the hyperbranched polyesters has ended, the hyperbranched polyesters can be isolated easily, for example by filtering off the catalyst and concentrating, the concentration typically being performed under reduced pressure. Further workup methods with good suitability are precipitation after addition of water or another solvent in which the hyperbranched polyester does not dissolve, and subsequent washing and drying.

If the hyperbranched polyester has been prepared without addition of solvent and with addition of only small amounts of catalyst, the reaction product, after the reaction has ended, is already in the form of an isolated hyperbranched polyester and can generally be used without any further purification steps.

In addition, the hyperbranched polyester can be prepared in the presence of enzymes or decomposition products of enzymes according to DE-A 101 63163.

The hydrophobic hyperbranched polyester is generally used in amounts of 0.2 to 40% by weight, preferably 1 to 30% by weight and more preferably 3 to 20% by weight, based on the sum of relatively high molecular weight compound b) and hydrophobic hyperbranched polyester. In general, an amount of as little as 3% by weight of hydrophobic hyperbranched polyester is sufficient to give rise to the desired open-cell content and coarse cells, thus providing very good tear propagation resistance of the polyurethane foams.

In a fifth embodiment, the relatively high molecular weight compound b) used is a mixture of polyester polyol and a hydrophobic, hyperbranched polycarbonate. An inventive hyperbranched polycarbonate is obtainable by reacting at least one carbonic ester ($A_2$) or derivatives thereof with l) at least one at least trihydric alcohol ($B_3$), or m) at least one dihydric alcohol ($B_2$) and at least one x-hydric alcohol ($C_x$) which has more than two OH groups, where x is greater than 2, where the overall mixture of alcohols used has a mean functionality of 2.1 to 10, where n) up to 50 mol %, preferably up to 40 mol %, more preferably up to 30 mol %, and especially preferably up to 20 mol % based on the alcohols $B_3$, $B_2$ and/or $C_x$, converted according to a) and b), of a hydrophobic long-chain monofunctional alcohol $E_1$ having at least 8 carbon atoms may also be reacted, and o) optional subsequent reaction with a long-chain hydrophobic OH-reactive compound F, such as a monocarboxylic acid or a monoisocyanate having at least 8 carbon atoms, p) optional subsequent reaction with propylene oxide and/or butylene oxide, where one or more of the following conditions are met:

I) the alcohol $B_3$ or $B_2$ and/or $C_x$ is a hydrophobic alkoxylate based on propylene oxide, butylene oxide or styrene oxide and having an average of at least 1 and at most 100 oxyalkylene units per starter molecule, and a difunctional (for $B_2$), trifunctional (for $B_3$) or x-functional (for $C_x$) starter molecule;

II) the alcohols $B_3$ or $B_2$ and/or $C_x$ comprise at least 20 mol %, preferably at least 30 mol %, more preferably at least 40 mol %, and most preferably at least 50 mol % of a long-chain diol or polyol having at least 8 carbon atoms;

III) at least 10 mol % and at most 90 mol %, preferably at most 70 mol %, more preferably at most 50 mol %, and especially preferably at most 30 mol %, based on the alcohols $B_3$, $B_2$ and/or $C_x$ converted according to 1) and m) of a long-chain monoalcohol having at least 8 carbon atoms are also reacted;

IV) there is subsequent reaction with 10 to 100 mol %, preferably 10 to 80 mol %, more preferably 20 to 80 mol %, and especially preferably 20 to 60 mol %, based on the mean number of OH groups of the hyperbranched polycarbonate, of the long-chain hydrophobic OH-reactive compound F having at least 8 carbon atoms, V) there is a subsequent reaction with, per equivalent of OH groups of the hyperbranched polycarbonate, 1 to 60, preferably with 2 to 50, more preferably with 3 to 40 and especially preferably with 3 to 30 equivalents of propylene oxide, butylene oxide or propylene oxide and butylene oxide.

A polycarbonate of the $A_xB_y$ type is a condensate of the molecules A and B where the molecules A have functional groups funkt1) and the molecules B have functional groups funkt2), and these are capable of condensation reactions with one another. The functionality of the molecules A here is equal to x, and the functionality of the molecules B here is equal to y. By way of example, mention may be made of a polycarbonate made of diethyl carbonate as molecule A (funkt1=COOEt, x=2) and propoxylated glycerol as molecule B (funkt2=OH; y=3). Hyperbranched polycarbonates are described by way of example in WO 2005/026234.

It is possible, of course, that the units A and B used also comprise mixtures of various molecules A having the same functional group and having the same and/or different functionalities, and of various molecules B having the same functional group and having the same and/or different functionalities. The functionalities x and y of the mixture are then obtained by averaging.

Suitable hyperbranched polycarbonates can be prepared, for example, by

1.) reacting at least one organic carbonate of the general formula $R^aOC(=O)OR^b$ with at least one aliphatic alcohol ($B_3$ or $C_x$) which has at least 3 OH groups, with elimination of alcohols $R^aOH$ or $R^bOH$ to give one or more condensation products (K), where $R^a$ and $R^b$ have each independently been selected from straight-chain or branched alkyl, arylalkyl, cycloalkyl, and aryl radicals, and $R^a$ and $R^b$ may also, together with the —OC(=O)O— group to which they are bonded, be a cyclic carbonate, 2.) reacting phosgene, diphosgene, or triphosgene with the alcohol ($B_3$ or $C_x$) mentioned under 1.), to give the condensation product K, with elimination of hydrogen chloride, and also 3.) intermolecularly converting the condensation products (K) to a high-functionality, hyperbranched polycarbonate, where the ratio of the OH groups with respect to the carbonates in the reaction mixture is selected in such a way that the condensation products (K) have an average of either one carbonate group and more than one OH group or one OH group and more than one carbonate group.

The $R^a$ and $R^b$ radicals may be the same or different. In one specific embodiment, $R^a$ and $R^b$ are the same. $R^a$ and $R^b$ are preferably selected from $C_1$-$C_{20}$-alkyl, $C_5$-$C_7$-cycloalkyl, $C_6$-$C_{10}$-aryl, and $C_6$-$C_{10}$-aryl-$C_1$-$C_{20}$-alkyl, as defined at the outset. $R^a$ and $R^b$ can also together be $C_2$-$C_6$-alkylene. $R^a$ and $R^b$ are more preferably selected from straight-chain and branched $C_1$-$C_5$-alkyl, as described in WO 2005/026234.

By way of example, dialkyl or diaryl carbonates can be prepared by reacting aliphatic, araliphatic, or aromatic alcohols, preferably monoalcohols, with phosgene. They may also be prepared by oxidative carbonylation of the alcohols or phenols by means of CO in the presence of noble metals, oxygen, or $NO_x$. The preparation of diaryl or dialkyl carbonates is also described in "Ullmann's Encyclopedia of Industrial Chemistry", 6th edition, 2000 Electronic Release, Verlag Wiley-VCH.

Examples of suitable carbonates comprise aliphatic or aromatic carbonates, such as ethylene carbonate, propylene 1,2- or 1,3-carbonate, diphenyl carbonate, ditolyl carbonate, dixylyl carbonate, dinaphthyl carbonate, ethyl phenyl carbonate, dibenzyl carbonate, dimethyl carbonate, diethyl carbonate, dipropyl carbonate, dibutyl carbonate, diisobutyl carbonate, dipentyl carbonate, dihexyl carbonate, dicyclohexyl carbonate, diheptyl carbonate, dioctyl carbonate, didecyl carbonate, or didodecyl carbonate.

Preference is given to using aliphatic carbonates, especially those in which the radicals comprise from 1 to 5 carbon atoms, e.g. dimethyl carbonate, diethyl carbonate, dipropyl carbonate, dibutyl carbonate, or diisobutyl carbonate.

The organic carbonates are reacted with at least one aliphatic alcohol ($B_3$ or $C_x$) which has at least 3 OH groups, or with a mixture of two or more of these alcohols.

A definition of at least trifunctional alcohols ($B_3$ and $C_x$) has been given already under the fourth embodiment, and they can be used as defined above.

Said polyfunctional alcohols can also be used in a mixture with difunctional alcohols ($B_2$), with the proviso that the average OH functionality of all of the alcohols used together is greater than 2. A definition has likewise been given already for the difunctional alcohols ($B_2$), and these can be used as defined above.

The reaction of the carbonate with the alcohol or alcohol mixture to give the hyperbranched polycarbonate as in 1.) takes place with elimination of the monofunctional alcohol or phenol from the carbonate molecule.

The reaction of the phosgene or phosgene derivative with the alcohol or alcohol mixture to give the hyperbranched polycarbonate as in 2.) takes place with elimination of hydrogen chloride.

The hyperbranched polycarbonates formed have termination by hydroxyl groups and/or by carbonate groups after the reaction, i.e. have no further modification.

A hyperbranched polycarbonate is understood to mean a product which also has, as well as the carbonate groups which form the polymer skeleton, at least four, preferably at least eight, terminal or pendent functional groups. The functional groups are carbonate groups and/or OH groups. There is in principle no upper restriction on the number of the terminal or pendent functional groups, but products having a very large number of functional groups can have undesired properties, for example high viscosity or poor solubility. The high-functionality polycarbonates of the present invention usually have not more than 500 terminal or pendent functional groups, preferably not more than 200 and especially not more than 100 terminal or pendent functional groups.

In the preparation of the hyperbranched polycarbonates, it is necessary to adjust the ratio of the compounds comprising OH groups to the carbonate in such a way that the simplest resulting condensation product (hereinafter termed condensation product (K)) comprises an average of either one carbonate group and more than one OH group or one OH group and more than one carbonate group. The simplest structure of the condensation product (K) composed of a carbonate (A) and a di- or polyalcohol (B) gives rise to the $XY_n$ or $YX_n$ arrangement where X is a carbonate group, Y is a hydroxyl group, and n is generally from 1 to 6, preferably from 1 to 4, more preferably from 1 to 3. The reactive group which is the single resulting group is referred to hereinafter as "focal group".

For example, when the reaction ratio in the preparation of the simplest condensation product (K) from a carbonate and a dihydric alcohol is 1:1, the average result is a molecule of XY type, illustrated by the general formula 1.

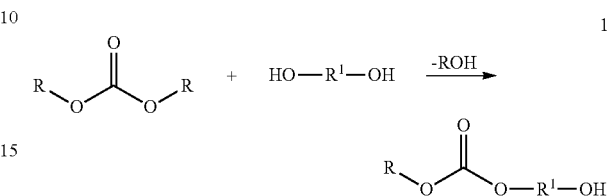

In the preparation of the condensation product (K) from a carbonate and a trihydric alcohol with a reaction ratio of 1:1, the average result is a molecule of $XY_2$ type, illustrated by the general formula 2. The focal group here is a carbonate group.

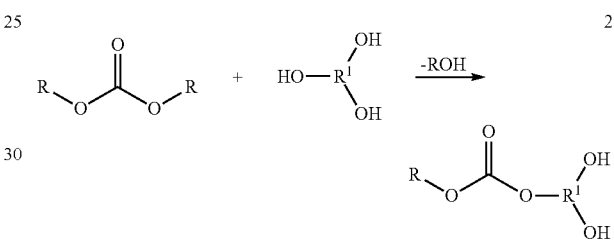

In the preparation of the condensation product (K) from a carbonate and a tetrahydric alcohol, likewise with the reaction ratio 1:1, the average result is a molecule of $XY_3$ type, illustrated by the general formula 3. The focal group here is a carbonate group.

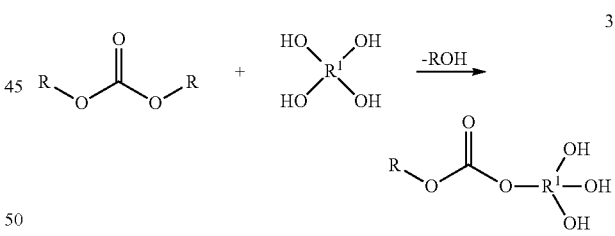

In the formulae 1 to 3, R is as defined at the outset for $R^a$ and $R^b$, and $R^1$ is a polyvalent aliphatic radical.

The condensation product (K) can also be prepared, for example, from a carbonate and a trihydric alcohol, illustrated by the general formula 4, the molar reaction ratio being 2:1. Here, the average result is a molecule of $X_2Y$ type; the focal group here is an OH group. In the formula 4, R and $R^1$ are each as defined in the formulae 1-3.

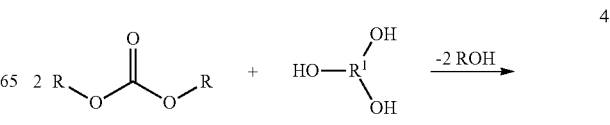

-continued

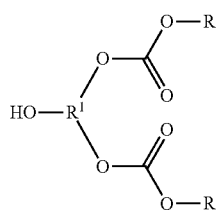

When difunctional compounds, for example a dicarbonate or a diol, are additionally added to the components, this brings about an extension of the chains, as illustrated in the general formula 5, for example. The average result is again a molecule of $XY_2$ type; the focal group is a carbonate group.

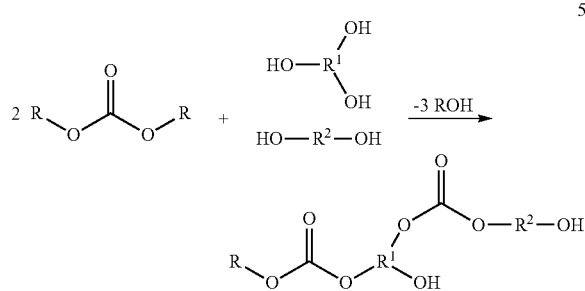

5

In formula 5, $R^2$ is a bivalent organic, preferably aliphatic, radical; R and $R^1$ are as defined above.

The simple condensation products (K) described by way of example in the formulae 1-5 preferentially react intermolecularly to form high-functionality polycondensation products, referred to as hereinafter polycondensation products (P). The reaction to give the condensation product (K) and to give the polycondensation product (P) usually takes place at a temperature of from 0 to 250° C., preferably from 60 to 160° C., in bulk or in solution. It is generally possible to use all solvents which are inert toward the particular reactants. Preference is given to using organic solvents, for example decane, dodecane, benzene, toluene, chlorobenzene, xylene, dimethylformamide, dimethylacetamide or Solvent Naphtha.

The amount of solvent added, unless working entirely without solvent, is in accordance with the invention at least 0.1% by weight, based on the mass of the starting materials which have been used and are to be converted, preferably at least 1% by weight and more preferably at least 10% by weight. It is also possible to use excesses of solvent, based on the mass of the starting materials which have been used and are to be converted, for example a 1.01- to 10-fold excess. Amounts of solvent of more than 100 times the mass of the starting materials which have been used and are to be converted are not advantageous, because the reaction rate declines significantly at significantly lower concentrations of the reactants, which leads to uneconomically long reaction times.

In a preferred embodiment, the condensation reaction is carried out in bulk. To accelerate the reaction, the phenol or the monofunctional alcohol ROH released in the reaction can be removed by distillation from the reaction equilibrium, if appropriate under reduced pressure.

If removal by distillation is intended, it is advisable to use those carbonates which release alcohols ROH having a boiling point of less than 140° C. in the reaction.

To accelerate the reaction, it is also possible to add catalysts or catalyst mixtures. Suitable catalysts are compounds which catalyze esterification or transesterification reactions, for example alkali metal hydroxides, alkali metal carbonates, alkali metal hydrogencarbonates, preferably of sodium, of potassium or of cesium, tertiary amines, guanidines, ammonium compounds, phosphonium compounds, organoaluminum, organotin, organozinc, organotitanium, organozirconium or organobismuth compounds, or else what are known as double metal cyanide (DMC) catalysts, as described, for example, in DE 10138216 or DE 10147712.

Preference is given to using potassium hydroxide, potassium carbonate, potassium hydrogencarbonate, diazabicyclooctane (DABCO), diazabicyclononene (DBN), diazabicycloundecene (DBU), imidazoles such as imidazole, 1-methylimidazole or 1,2-dimethylimidazole, titanium tetrabutoxide, titanium tetraisopropoxide, dibutyltin oxide, dibutyltin dilaurate, tin dioctoate, zirconium acetylacetonate or mixtures thereof.

The catalyst is generally added in an amount of from 50 to 10 000 ppm by weight, preferably from 100 to 5000 ppm by weight, based on the amount of the alcohol mixture or alcohol used.

In addition, it is also possible to control the intermolecular polycondensation reaction by addition of the suitable catalyst or else by selection of a suitable temperature. It is also possible to adjust the average molecular weight of the polymer (P) via the composition of the starting components and via the residence time.

The condensation products (K) and the polycondensation products (P) prepared at elevated temperature are typically stable at room temperature for a prolonged period.

Owing to the nature of the condensation products (K), it is possible for the condensation reaction to result in polycondensation products (P) with different structures, which have branching but no crosslinking. Moreover, in the ideal case, the polycondensation products (P) have either one carbonate group as focal group and more than two OH groups or else one OH group as focal group and more than two carbonate groups. The number of the reactive groups depends on the nature of the condensation products (K) used and the degree of polycondensation.

For example, a condensation product (K) of the general formula 2 can react by triple intermolecular condensation to give two different polycondensation products (P) which are represented in the general formulae 6 and 7:

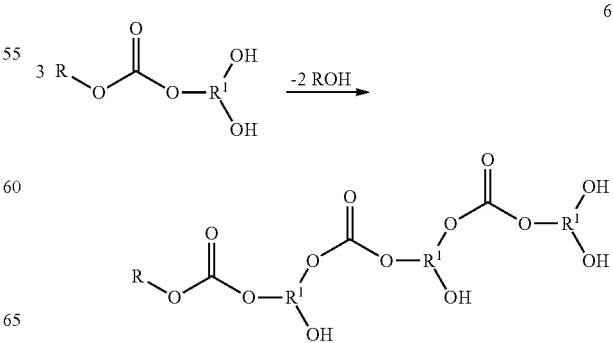

6

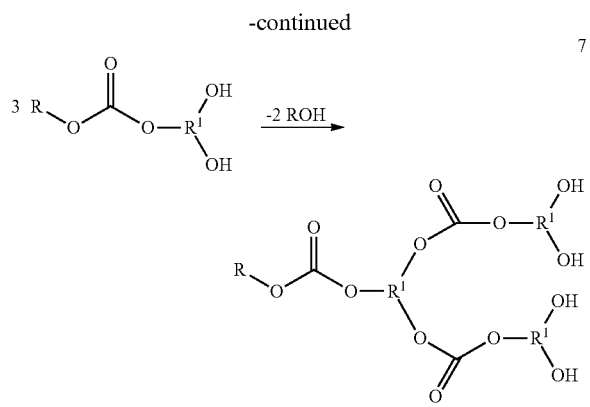

In formulae 6 and 7, R and R¹ are each as defined above.

It is also possible to work at significantly reduced pressure, for example at 10 to 500 mbar. The process for preparing the hyperbranched polycarbonate can also be performed at pressures above 500 mbar. For reasons of simplicity, preference is given to reaction at atmospheric pressure; it can also be performed at slightly elevated pressure, for example up to 1200 mbar. It is also possible to work under significantly elevated pressure, for example at pressures up to 10 bar. Preference is given to reaction at atmospheric pressure.

The reaction time in the process according to the invention is typically 10 minutes to 24 hours, preferably 30 minutes to 18 hours, more preferably 1 to 16 hours, and especially preferably 4 to 12 hours.

For the termination of the intermolecular polycondensation reaction, there are various options. For example, the temperature can be lowered to a range in which the reaction stops and the product (K) or the polycondensation product (P) is storage-stable.

In another embodiment, as soon as a polycondensation product (P) with the desired degree of polycondensation is present as a result of the intermolecular reaction of the condensation product (K), a product having groups reactive toward the focal group of (P) may be added to the product (P) to terminate the reaction. For example, in the case of a carbonate group as focal group, a mono-, di-, or polyamine may be added. In the case of a hydroxyl group as focal group, for example, a mono-, di- or polyisocyanate, a compound comprising epoxy groups or an acid derivative which reacts with OH groups can be added to the product (P).

The hyperbranched polycarbonates are usually prepared in a pressure range from 0.1 mbar to 20 bar, preferably at from 1 mbar to 5 bar, in reactors or reactor cascades which are operated batchwise, semi-continuously or continuously.

By virtue of the abovementioned adjustment of the reaction conditions and, if appropriate, by virtue of the selection of the suitable solvent, the products can be further processed without further purification after their preparation.

In a further preferred embodiment, the polycarbonates may receive other functional groups in addition to the functional groups already present as a result of the reaction. The functionalization may take place during the molecular weight buildup, or else subsequently, i.e. after completion of the actual polycondensation.

Subsequent functionalization can be obtained by reacting the resulting high-functionality hyperbranched polycarbonate with a suitable functionalizing reagent which can react with the OH and/or carbonate groups of the polycarbonate.

High-functionality hyperbranched polycarbonates comprising hydroxyl groups can be modified, for example, by addition of molecules F comprising acid groups or isocyanate groups. For example, polycarbonates can be modified hydrophobically by reaction with monocarboxylic acids or monoisocyanates.

Suitable hydrophobic long-chain aliphatic carboxylic acids are, for example, octanoic acid, decanoic acid, dodecanoic acid, tetradecanoic acid, and fatty acids such as stearic acid, oleic acid, lauric acid, palmitic acid, linoleic acid and linolenic acid.

Moreover, high-functionality polycarbonates comprising hydroxyl groups can also be converted to hydrophobic hyperbranched polycarbonate polyether polyols by reaction with propylene oxide and/or butylene oxide.

A great advantage of the process for preparing hyperbranched polycarbonates lies in its economic viability. Both the reaction to give a condensation product (K) or polycondensation product (P) and the reaction of (K) or (P) to give polycarbonates with other functional groups or elements can take place in one reaction apparatus, which is technically and economically advantageous.

For the purposes of the present invention, hyperbranched polycarbonates have molecular and structural nonuniformity. They differ from dendrimers in having molecular nonuniformity and are therefore considerably less expensive to produce.

In one embodiment, I), of the invention, the alcohol $B_3$ or $B_2$, and/or $C_x$, is a hydrophobic alkoxylate based on propylene oxide or butylene oxide and having an average of at least 1 and at most 100 oxyalkylene units per starter molecule, preferably at most 50 oxyalkylene units per starter molecule. Preferred alcohols $B_3$ or $B_2$, and/or $C_x$, are the propoxylates of monoethylene glycol, diethylene glycol, propylene glycol, dipropylene glycol, tripropylene glycol, glycerol, trimethylolpropane, pentaerythritol, sorbitol, or sucrose, where these have an average of from 1 to 30 oxypropylene units per OH group, in particular from 1 to 20 oxypropylene units per OH group.

In another embodiment, II), of the invention, the alcohols $B_3$ or $B_2$, and/or $C_x$, comprise at least 20 mol %, preferably at least 30 mol %, especially 40 mol % and very especially at least 50 mol % of a long-chain diol or polyol having at least 8 carbon atoms, preferably having at least 10 carbon atoms, more preferably having at least 12 carbon atoms. Particularly preferred diols or polyols having at least 8 carbon atoms are isomers of octanediol, of nonanediol, of decanediol, of dodecanediol, of tetradecanediol, of hexadecanediol, of octadecanediol, of dimethylolcyclohexane, and of dimethylolbenzene.

In another embodiment, III), of the invention, the reaction includes at least 10 mol % and at most 90 mol %, preferably at most 70 mol %, more preferably at most 50 mol %, and especially preferably at most 30 mol %, based on the alcohols $B_3$, $B_2$ and/or $C_x$ converted according to a) and b) of a long-chain monoalcohol $E_1$ having at least 8 carbon atoms, preferably having at least 10 carbon atoms. Preferred long-chain monoalcohols are octanol, decanol, dodecanol, tetradecanol, $C_{16}$ alcohols and $C_{18}$ alcohols.

In another embodiment, IV), of the invention, the reaction product obtained from components a) and b) is then reacted with 10 to 100 mol %, preferably 20 to 100 mol %, more preferably 20 to 80 mol %, especially preferably 20 to 60 mol %, based on the mean number of the OH groups of the hyperbranched polycarbonate, of a long-chain hydrophobic OH-reactive compound F, such as a monocarboxylic acid or a monoisocyanate, having at least 8 carbon atoms, preferably at least 10 carbon atoms, in particular having at least 12 carbon atoms. Preferred long-chain monocarboxylic acids F are octanoic acid, decanoic acid, dodecanoic acid, tetradecanoic acid, and fatty acids, such as stearic acid and oleic acid. Preferred long-chain monoisocyanates F are octane isocyanate, decane isocyanate, dodecane isocyanate, tetradecane isocyanate, and monoisocyanates of fatty acids, e.g. stearyl isocyanate and oleyl isocyanate.

Especially preferred hydrophobic hyperbranched polycarbonates are obtained when

I) the alcohol $B_3$ or $B_2$ and/or $C_x$ is a hydrophobic alkoxylate based on propylene oxide or butylene oxide and having an average of 1 to 15 oxyalkylene units per OH group;

or

I) the alcohol $B_3$ or $B_2$ and/or $C_x$ is a hydrophobic alkoxylate based on propylene oxide or butylene oxide and having an average of 1 to 15 oxyalkylene units per OH group, and one of the two components, the carbonic ester or the alcohol component, within the reaction mixture for synthesis of the hyperbranched polycarbonate, is used in a molar excess and the molar ratio of the (CO)OR groups with respect to the OH groups or the excess of the OH groups with respect to the (CO)OR groups is from 1.1:1 to 3:1, preferably from 1.3:1 to 2.8:1, preferably from 1.5:1 to 2.6:1, more preferably from 1.7:1 to 2.4:1, very preferably from 1.8:1 to 2.2:1, and especially preferably from 1.9:1 to 2.1:1, or I) the alcohol $B_3$ or $B_2$ and/or $C_x$ is a hydrophobic alkoxylate based on propylene oxide or butylene oxide and having an average of 1 to 15 oxyalkylene units per OH group, and III) at least 10 mol % and at most 90 mol %, preferably at most 70 mol %, more preferably at most 50 mol % and especially preferably at most 30 mol %, based on the alcohols $B_3$, $B_2$ and/or $C_x$ converted according to a) and b) of a long-chain monoalcohol $E_1$ having at least 8 carbon atoms are also reacted, or I) the alcohol $B_3$ or $B_2$ and/or $C_x$ is a hydrophobic alkoxylate based on propylene oxide or butylene oxide and having an average of 1 to 15 oxyalkylene units per OH group, and IV) then the reaction product formed from a) and b) is reacted with 10 to 100 mol %, preferably 20 to 100 mol %, more preferably 20 to 80 mol %, especially preferably 20 to 60 mol %, based on the mean number of OH groups of the hyperbranched polycarbonate, of a long-chain hydrophobic OH-reactive compound $F_1$, such as a monocarboxylic acid or a monoisocyanate, having at least 8 carbon atoms.

The hydrophobic hyperbranched polycarbonate used in accordance with the invention generally has a number-average molecular weight $M_n$ of 800 to 40 000 g/mol, preferably of 1000 to 30 000 g/mol, and especially of 1500 to 20 000 g/mol, measured by GPC, calibrated with a polymethyl methacrylate (PMMA) standard.

it has been found that a particularly advantageous weight-average molar mass $M_w$, measured by GPC calibrated with a polymethyl methacrylate (PMMA) standard is from 2000 to 50 000 g/mol, preferably from 3000 to 40 000 g/mol, particularly preferably from 4000 to 35 000 g/mol, and with particular preference from 5000 to 30 000 g/mol.

In general, the hydrophobic hyperbranched polycarbonate used in accordance with the invention has an OH number to DIN 53240 of 0 to 600 mg KOH/g of polycarbonate, preferably of 0 to 500 mg KOH/g, especially of 0 to 400 mg KOH/g.

In addition, the hydrophobic hyperbranched polycarbonates used in accordance with the invention generally have a glass transition temperature (measured by ASTM method D3418-03 with DSC) of −80 to 100° C., preferably −60 to 60° C.

Once the reaction to prepare the hyperbranched polycarbonates has ended, the hyperbranched polycarbonates can be isolated easily, for example by filtering off the catalyst and concentrating, the concentration typically being performed under reduced pressure. Further workup methods with good suitability are precipitation after addition of water or another solvent in which the hyperbranched polycarbonate does not dissolve, and subsequent washing and drying.

If the hyperbranched polycarbonate has been prepared without addition of solvent and with addition of only small amounts of catalyst, the reaction product, after the reaction has ended, is already in the form of an isolated hyperbranched polycarbonate and can generally be used without any further purification steps.

The hydrophobic hyperbranched polycarbonate is generally used in amounts of 0.2 to 40% by weight, preferably 1 to 30% by weight and more preferably 3 to 20% by weight, based on the sum of relatively high molecular weight compound b) and hydrophobic hyperbranched polycarbonate. In general, an amount of as little as 3% by weight of hydrophobic hyperbranched polycarbonate is sufficient to give rise to the desired open-cell content and coarse cells, thus providing very good tear propagation resistance of the polyurethane foams.

Components (a) to (f) in the first to fifth embodiments are mixed with one another to produce an inventive polyurethane foam in such amounts that the equivalents ratio of NCO groups of the polyisocyanates (a) to the sum of the reactive hydrogen atoms of components (b), (c), and (d) is 1:0.7 to 1:1.25, preferably 1:0.85 to 1:1.15.

The inventive polyurethane foams are preferably produced by the one-shot method, using low-pressure technology or high-pressure technology. The reaction mixture here can be charged to an open or closed mold, if appropriate under temperature control. The molds are usually composed of metal, e.g. aluminum or steel, or of paperboard or wood. These procedures are described by way of example by Piechota and Rohr in "Integralschaumstoff" [Integral Foam], Carl-Hanser-Verlag, Munich, Vienna, 1975, or in "Kunststoffhandbuch", Band 7, Polyurethane [Plastics handbook, volume 7, Polyurethanes], 3rd edition, 1993, chapter 7. The inventive polyurethane foams are more preferably obtained by means of unrestricted foaming.

To produce the polyurethane integral foams, the starting components (a) to (f) are mixed preferably at a temperature of 15 to 90° C., more preferably of 25 to 55° C., and the reaction mixture is introduced into the closed mold, optionally under elevated pressure. The mixing can be performed mechanically by means of a stirrer or a stirrer screw, or under high pressure in the countercurrent injection process. The mold temperature is appropriately 20 to 160° C., preferably 30 to 120° C. and more preferably 30 to 60° C. In the context of the invention, the mixture of components (a) to (g) is referred to as the reaction mixture at reaction conversions of less than 90%, based on the isocyanate groups.

The amount of the reaction mixture introduced into the mold is judged in such a way that the resultant foam moldings have a density of 70 to 300 g/dm$^3$, preferably 80 to 300 g/dm$^3$, more preferably 90 to 300 g/dm$^3$, and especially 100 to 250 g/dm$^3$.

An inventive polyurethane foam has 1 to 20 cells per cm, preferably 1 to 10, and is preferably used as a cleaning sponge. This foam exhibits excellent mechanical properties, such as tensile strain at break, tear propagation resistance, elongation at break, and rebound resilience. Adequate rebound performance is required especially when the polyurethane material is to be used as a cleaning sponge for cleaning pipes or other hollow bodies. At the same time, rebound performance should be so high that the foams completely fills the pipe cross section at any time, even when the cleaning sponge undergoes deformation when being moved. Rebound resilience to DIN 53573 is preferably 30% or greater, more preferably 35% or greater, and especially 40% or greater. An inventive polyurethane foam, given a density of 125 g/L, preferably has, after storage for 24 hours, tensile strength to DIN EN ISO 1798 greater than 200 kPa, more preferably greater than 300 kPa, and especially greater than 400 kPa, elongation at break to DIN EN ISO 1798 of greater than 200%, more preferably greater than 300%, tear propagation resistance to ISO 34-1 of greater than 1.2 N/mm, more preferably of greater than 1.8 N/mm, and especially of greater than 2.5 N/mm, and compressive strength, for 40% compression, to DIN EN ISO 3386, of less than 40%, more preferably less than 30%.

Owing to the outstanding properties, an inventive polyurethane foam is also useable as a pipe cleaning sponge, for example in concrete pumps, dispensing systems, milking systems, and power plants. In addition, an inventive polyurethane foam can be used as a wastewater cleaning element, filter, for example for aquaria, liquid store, roller for applying liquids, for example as a paint roller, or as a carrier material for algae in water treatment. When an inventive polyurethane foam also comprises an outer skin, it is useable wherever, for example, high elasticity and good mechanical properties are required, for example as a games ball, particularly in sports halls, as a shoe sole, as a steering wheel, as a wheel, for example for weight-bearing trolleys, wheelchairs and children's toys, for example toy cars, or as ridge drums for combine harvesters.

The invention is illustrated hereinafter by examples:
Starting Materials
Polyol 1: Polyester polyol based on adipic acid, monoethylene glycol and 1,4-butanediol, with an OH number of 56
Polyol 2: Glycerol-started polyether polyol with OH number of 35 and predominantly primary OH groups
Polyol 3: Polyetherol based on sorbitol, propylene oxide and ethylene oxide with OH number of 18 and predominantly primary OH groups
Polyol 4: Copolymer of unsaturated polyetherol, stearyl acrylate and styrene, dispersed in polyol 2
Polyol 5: Hyperbranched polyester
Polyol 6: Hyperbranched polycarbonate
Chain extender 1: Monoethylene glycol
Chain extender 2: 1,4-Butanediol
Catalyst 1: Triethylenediamine
Inhibitor: Diglycol bis(chloroformate)
Foam stabilizer: DC 193® from Dow Corning, silicone-based
Blowing agent: Water
Isocyanate 1: Prepolymer (61 parts by weight of 4,4'-diisocyanatodiphenylmethane (pure MDI), 2 parts by weight of uretonimine-modified pure MDI, 33 parts by weight of a linear propylene glycol-started polyoxypropylene etherol (OHZ 55 mg KOH/mg), 4 parts by weight of tripropylene glycol
Isocyanate 2: Prepolymer (50 parts by weight of 4,4' diisocyanatodiphenylmethane (pure MDI), 4 parts by weight of uretonimine-modified pure MDI, 29 parts by weight of a polyester polyol based on adipic acid, monoethylene glycol and 1,4-butanediol with an OH number of 56; 10 parts by weight of a polyester polyol based on adipic acid, monoethylene glycol, diethylene glycol and trimethylolpropane with an OH number of 60 and 7 parts by weight of a cyclic ester Polyol 4 is obtained as follows:
Polyol 3 is functionalized with isopropenylbenzyl isocyanate. 185.6 g of the reaction product, 61.9 g of stearyl acrylate, 123.8 g styrene, 3.7 g of dodecanethiol, 191.3 g, 371.3 g of polyol 2 and 3.7 g of azoisobutyronitrile are mixed in a three-neck flask with water cooling, stirrer and temperature sensor. The reaction mixture is heated to 60° C. while stirring, and stirred for 24 hours. The residual monomers are distilled off at 135° C. under reduced pressure while stirring.

Polyol 5 is obtained as follows:
1740 g (5.00 mol, M=348 g/mol) of octadecenylsuccinic anhydride (Pentasize 8a from Trigon), 590.7 g (1.37 mol, M=430 g/mol) of a polyetherol based on trimethylolpropane grafted randomly with 5 propylene oxide units, and 0.2 g of dibutyltin dilaurate were weighed into a 4 l glass flask equipped with stirrer, internal thermometer and descending condenser with vacuum connection, and heated gradually to 185° C. while stirring. In the course of this, a vacuum of 10 mbar was applied gradually, and the mixture foamed a little as a result of the gas bubbles which arose. The reaction mixture was stirred at 185° C. for 20 h, in the course of which the water formed in the reaction distilled off. The decrease in the acid number was checked regularly until a value of about 108 mg KOH/g had been attained. Thereafter, the product was cooled and analyzed.
Analysis:
Analysis number: 108 mg KOH/g
GPC: Mn=930, Mw=6100 (eluent: THF, calibration: PMMA)

Polyol 6 was obtained as follows:
In a 2 l flask, equipped with stirrer, internal thermometer, and reflux condenser, diethyl carbonate (144 g, 1.22 mol) was reacted with a triol (1149 g, 1.11 mol), which had been obtained beforehand by propoxylation of trimethylolpropane with 15 propylene oxide units in the presence of dibutyltin (IV) dilaurate (1.0 g) at standard pressure while sparging gently with nitrogen at approx. 140° C. In the course of the reaction, ethanol formed constantly as a condensation by-product in the reaction mixture, such that the boiling point of the reaction mixture was lowered down to approx. 120° C. within 12 h. Subsequently the reflux condenser was exchanged for a distillation apparatus consisting of a 20 cm column with random packing, a descending condenser and a receiver, and the ethanol formed in the reaction was distilled off continuously. Once a total of about 85 g of ethanol has been removed, which corresponds to an overall conversion based on ethanol of approx. 76%, the reaction mixture was provided with a gas inlet tube and stripped with nitrogen at 100° C. for approx. 1 h. This removed further residues of ethanol or low molecular weight components. Subsequently the product was cooled and analyzed.

The OH number was determined to be 85 mg KOH/g; the molar masses were determined by means of GPC (eluent=dimethylacetamide (DMAC), calibration=PMMA) to be $M_n$=4200 g/mol, $M_w$=14 500 g/mol.

Polyols 5 and 6 were analyzed as follows:
The polyols 5 and 6 prepared were analyzed by gel permeation chromatography with a refractometer as the detector. The mobile phase used was tetrahydrofuran (THF) or dimethylacetamide (DMAc); the standard used to determine the molecular weight was polymethyl methacrylate (PMMA). The OH number was determined to DIN 53240, part 2.

The polyol component A used consists of 87.45 parts by weight of polyol 1, 10.5 parts by weight of chain extender 1, 0.7 part by weight of catalyst, 0.15 part by weight of foam stabilizer and 1.2 parts by weight of blowing agent.

The polyol component B used consists of 90.2 parts by weight of polyol 1, 7.3 parts by weight of chain extender 1, 0.7 part by weight of catalyst, 0.2 part by weight of inhibitor, 0.2 part by weight of foam stabilizer and 1.4 parts by weight of blowing agent.

The polyol component C used consists of 85.7 parts by weight of polyol 1, 4.5 parts by weight of polyol 3, 4.4 parts by weight of chain extender 1, 3 parts by weight of chain extender 2, 0.7 part by weight of catalyst, 0.2 part by weight of inhibitor, 0.1 part by weight of foam stabilizer and 1.4 parts by weight of blowing agent.

The polyol component D used consists of 82 parts by weight of polyol 1, 8 parts by weight of polyol 4, 7.4 parts by weight of chain extender 1, 0.7 part by weight of catalyst, 0.2 part by weight of inhibitor, 0.3 part by weight of foam stabilizer and 1.4 parts by weight of blowing agent.

The polyol component E used consists of 83.2 parts by weight of polyol 1, 7 parts by weight of polyol 5, 7.3 parts by weight of chain extender 1, 0.7 part by weight of catalyst, 0.2 part by weight of inhibitor, 0.2 part by weight of foam stabilizer and 1.4 parts by weight of blowing agent.

The polyol component F used consists of 85.8 parts by weight of polyol 1, 4.5 parts by weight of polyol 6, 4.4 parts by weight of chain extender 1, 3 parts by weight of chain extender 2, 0.7 part by weight of catalyst, 0.1 part by weight of inhibitor, 0.1 part by weight of foam stabilizer and 1.4 parts by weight of blowing agent.

Tests:

Reaction Mixture 1 (RM1):

100 parts by weight of polyol component A (45° C.) and 67 parts by weight of isocyanate 1 (40° C.) and 67 parts by weight of isocyanate 2 (40° C.) were mixed with one another, and this mixture was introduced into a paperboard mold (140×150×150 mm) to obtain the open- and coarse-cell foam thus produced. The polyether content, based on the total weight of polyether and polyester in isocyanate 1, isocyanate 2 and polyol 1, is approx. 15.8% by weight.

Reaction Mixture 2 (RM2):

100 parts by weight of polyol component A (45° C.) and 71.5 parts by weight of isocyanate 1 (40° C.) and 58.5 parts by weight of isocyanate 2 (40° C.) were mixed with one another, and this mixture was introduced into a paperboard mold (140×150×150 mm) to obtain the open- and coarse-cell foam thus produced. The polyether content, based on the total weight of polyether and polyester in isocyanate 1, isocyanate 2 and polyol 1, is approx. 17.1% by weight.

Reaction Mixture 3 (RM3):

100 parts by weight of polyol component C (45° C.) and 115 parts by weight of isocyanate 2 (40° C.) were mixed with one another, and this mixture was introduced into a plastic bucket (5 l) to obtain the open- and coarse-cell foam thus produced. The polyether content, based on the total weight of polyether and polyester in isocyanate 2 and polyol 1, is approx. 3.1% by weight.

Reaction Mixture 4 (RM4):

100 parts by weight of polyol component D (45° C.) and 117 parts by weight of isocyanate 2 (40° C.) were mixed with one another, and this mixture was introduced into a plastic bucket (5 l) to obtain the open- and coarse-cell foam thus produced.

Reaction Mixture 5 (RM5):

100 parts by weight of polyol component E (45° C.) and 128 parts by weight of isocyanate 2 (40° C.) were mixed with one another, with a low-pressure casting machine, and this mixture was introduced into a plastic bucket (5 l) to obtain the open- and coarse-cell foam thus produced.

Reaction Mixture 6, Compacted (RM6):

100 parts by weight of polyol component E (45° C.) and 128 parts by weight of isocyanate 2 (40° C.) were mixed with one another, with a low-pressure casting machine, and this mixture was introduced into an aluminum mold (200×200×10 mm) at a temperature of 35° C., the mold was closed and the polyurethane integral foam thus produced was demolded after 4 minutes.

Reaction Mixture 7 (RM7):

100 parts by weight of polyol component F (45° C.) and 117 parts by weight of isocyanate 2 (40° C.) were mixed with one another, with a low-pressure casting machine, and this mixture was introduced into a plastic bucket (5 l) to obtain the open- and coarse-cell foam thus produced.

Reaction Mixture 8, Comparative (RM8):

100 parts by weight of polyol component A (45° C.) and 14 parts by weight of isocyanate 1 (40° C.) and 126 parts by weight of isocyanate 2 (40° C.) were mixed with one another, and this mixture was introduced into a paperboard mold (140×150×150 mm). The foam obtained shrunk significantly, and so no mechanical testing was possible thereon. The polyether content, based on the total weight of polyether and polyester in isocyanate 1, isocyanate 2 and polyol 1, was approx. 3.0% by weight.

Reaction Mixture 9, Comparative (RM9):

100 parts by weight of polyol component B (45° C.) and 121 parts by weight of isocyanate 2 (40° C.) were mixed with one another, and this mixture was introduced into a plastic bucket (5 l). The polyether content, based on the total weight of polyether and polyester in isocyanate 1, isocyanate 2 and polyol 1, was approx. 0% by weight.

The mechanical properties of the sample produced, after storage for 24 hours, were determined to DIN EN ISO 1798, 3386, 53573 and ISO 34-1 and are listed in table 1. Water absorption was determined by means of an in-house method: this involved forcing the air out of the foam under water. Once it had become fully saturated with water, the percentage weight increase was determined.

TABLE 1

|    | RM1  | RM 2 | RM3 | RM4 | RM5  | RM6  | RM7  | RM8 (C)  | RM9 (C)  |
|----|------|------|-----|-----|------|------|------|----------|----------|
| RG | 125  | 130  | 136 | 158 | 99   | 260  | 154  | >350 g/L | >350 g/l |
| SH | 24   | 21   | 22  | 37  | 18   |      | 25   | —        | —        |
| ZF | 622  | 580  | 443 | 381 | 411  | 2500 | 454  | —        | —        |
| BD | 303  | 338  | 351 | 322 | 281  | 337  | 291  | —        | —        |
| WF | 4.1  | 4.2  | 3.9 | 3.6 | 2.08 | 2.86 | 3.65 | —        | —        |
| RE | 33   | 35   | 45  | 48  | 36   | 36   | 47   | —        | —        |
| WA |      |      |     |     | 640  |      | 520  |          |          |
| DR |      |      |     |     |      | 8.8  | 4.1  |          |          |

TABLE 1-continued

| | RM1 | RM 2 | RM3 | RM4 | RM5 | RM6 | RM7 | RM8 (C) | RM9 (C) |
|---|---|---|---|---|---|---|---|---|---|
| ZS | coarse, open | coarse, open | coarse, open | coarse, open | coarse, open | moderately coarse, open | coarse, open | fine, shrunken | fine, shrunken |

In this table, RG means density in g/l, SH means compressive strength at 40% compression in kPa, ZF means tensile strength in kPa, BD means elongation at break in %, WF means tear propagation resistance N/mm, RE means rebound resilience in %, WA means water absorption in %, DR means compression set in % after 72 hours at room temperature for RM6, and after 6 hours at 50° C. for RM7, and in both cases 50% compression, and ZS means cell structure.

Table 1 shows that the specimen produced from the inventive reaction mixtures RM1 to RM7, in addition to the open and coarse cell structure, has the mechanical properties, in particular the necessary tear propagation resistance for use as a pipe cleaning sponge, and exceeds the values of the latex foam currently being used. The tear propagation resistances and the tensile strengths of the latex foam are only 1.6 N/mm and 236 kPa respectively, with a density of 170 g/L. The tear propagation properties of known flexible polyurethane foams which are used as cleaning sponges are less than 1 N/mm and they therefore cannot be used for the application as a pipe cleaning sponge. At the same time, the specimen of reaction mixture 6 (RM6) exhibits a moderately coarse cell structure since the production involved compaction in the closed mold.

The mechanical properties of the foam from reaction mixtures 8 and 9 cannot be determined since the foam specimen shrinks significantly, and therefore no viable measurement is possible.

The data for the compressed sample (RM6), which exhibits only a volume shrinkage of less than 2%, illustrate that it is possible with this material to attain mechanical values for producing, for example arm rests or wheelbarrow tires.

The invention claimed is:

1. An open-cell polyurethane foam having
a density of 70 to 300 g/L,
1 to 20 cells/cm,
a rebound resilience greater than 30%,
an elongation at break of greater than 200%,
a tear propagation resistance of greater than 1.2 N/mm, and
a tensile strength of greater than 200 kPa.

2. The open-cell polyurethane foam according to claim 1, comprising polyester and polyether structures and obtained with a blowing agent comprising water.

3. A process for producing the open-cell polyurethane foam according to claim 1, the process comprising mixing:
a) a compound comprising isocyanate groups and comprising reacted a1) MDI, optionally a2) a polyetherol, optionally a3) a polyesterol, and, optionally a4) a chain extender, wherein a content of MDI having a functionality of greater than 2 is less than 30% by weight, based on total weight of the MDI a1),
b) a high molecular weight compound comprising a group reactive toward isocyanate, the compound further comprising a polyetherol or a polyesterol or any combination thereof, and having a molecular weight of greater than 450 g/mol,
c) a blowing agent comprising water,
d) optionally a chain extender,
e) optionally a catalyst, and
f) optionally another assistant, another additive, or any combination thereof,
thereby obtaining a reaction mixture,
the process further comprising allowing the reaction mixture to react fully, thereby obtaining the polyurethane foam,
wherein the compound a2), a3), and b) is at least one polyetherol and at least one polyesterol,
a content of polyetherol is greater than 5% by weight, based on a total weight of components a2), a3), and b), and
a mean functionality of compounds a2), a3) and b) is less than 2.4.

4. The process according to claim 3, wherein the compound a) having isocyanate groups is a compound comprising reacted a1) MDI and a2) polyetherol.

5. The process according to claim 4, wherein the compound a) having isocyanate groups is a compound comprising reacted a1) MDI and a2) polyetherol, and a compound comprising reacted a1) MDI and a2) polyesterol.

6. The process according to claim 5, wherein a weight ratio of the compound comprising reacted a1) MDI and a2) polyetherol and the compound comprising reacted a1) MDI and a3) polyesterol, is 35:65 to 70:30.

7. The process according to claim 3, wherein the high molecular weight compound b) consists of at least one polyesterol.

8. A process for producing the open-cell polyurethane foam according to claim 1, the process comprising mixing:
a) a compound comprising isocyanate groups and comprising reacted a1) MDI, a2) a polyetherol, optionally a3) a polyesterol, and optionally a4) a chain extender, wherein a content of MDI having a functionality of greater than 2 is less than 30% by weight, based on a total weight of the MDI a1),
b) a high molecular weight compound comprising a group reactive toward isocyanate,
c) a blowing agent comprising water,
d) optionally a chain extender,
e) optionally a catalyst, and
f) optionally another assistant, another additive, or any combination thereof,
thereby obtaining a reaction mixture,
the process further comprising allowing the reaction mixture to react fully, thereby obtaining the polyurethane foam,
wherein the high molecular weight compound b) is a mixture comprising polyester polyol and high-functionality polyetherol having a functionality of at least 4, and
the high molecular weight compound b) has a molecular weight of from 5000 to 30,000 g/mol.

9. The process according to claim 8, wherein the high-functionality polyetherol is a polyoxypropylenepolyoxyethylenepolyol comprising a sugar molecule as a starter molecule.

10. The process according to claim 8, wherein a proportion of high-functionality polyetherol is less than 20% by weight, based on a total weight of polyols a2), a3), and b).

11. A process for producing the open-cell polyurethane foam according to claim 1, the process comprising mixing
a) a compound comprising isocyanate groups and comprising reacted a1) MDI, optionally a2) a polyetherol, optionally a3) a polyesterol, and optionally a4) a chain extender, wherein a content of MDI having a functionality of greater than 2 is less than 30% by weight, based on a total weight of the MDI a1), b) a high molecular weight compound comprising a group reactive toward isocyanate, c) a blowing agent comprising water, d) optionally a chain extender, e) optionally a catalyst, and f) optionally another assistant, another additive, or any combination thereof, thereby obtaining a reaction mixture, the process further comprising allowing the reaction mixture to react fully, thereby obtaining the polyurethane foam, wherein the high molecular weight compound b) is a mixture comprising polyester polyol and copolymer (C) having a functionality toward isocyanate of at least 4, and the high molecular weight compound b) has a molecular weight of from 20,000 to 200,000 g/mol.

12. The process according to claim 11, wherein the copolymer (C) comprises, in reacted form, an α,β-ethylenically unsaturated monomer and an unsaturated polyether polyol.

13. A process for producing the open-cell polyurethane foam according to claim 1, the process comprising mixing a) a compound comprising isocyanate groups and comprising reacted a1) MDI, optionally a2) a polyetherol, optionally a3) a polyesterol, and optionally a4) a chain extender, wherein a content of MDI having a functionality of greater than 2 is less than 30% by weight, based on a total weight of the MDI a1), b) a high molecular weight compound comprising a group reactive toward isocyanate, the compound further comprising a polyetherol or a polyesterol or any combination thereof, c) a blowing agent comprising water, d) optionally a chain extender, e) optionally a catalyst, and f) optionally another assistant, another additive, or any combination thereof, thereby obtaining a reaction mixture, the process further comprising allowing the reaction mixture to react fully, thereby obtaining the polyurethane foam, wherein the high molecular weight compound b) is a mixture comprising polyester polyol and hyperbranched polyester, and said hyperbranched polyester is obtained by a process comprising reacting a dicarboxylic acid or derivative thereof with s1) an at least trihydric alcohol ($B_3$), or t1) a dihydric alcohol ($B_2$) and a x-hydric alcohol ($C_x$) which has more than two OH groups where x is greater than 2, wherein an overall mixture of alcohols has a mean functionality of 2.1 to 10, or by a process comprising reacting a y-acidic polycarboxylic acid ($D_y$) or derivative thereof which has more than two acid groups where y is greater than 2, with s2) an at least dihydric alcohol ($B_2$), or t2) a dihydric alcohol ($B_2$) and a x-hydric alcohol ($C_x$) which has more than two OH groups where x is greater than 2, optionally u) reacting up to 50 mol %, based on alcohols $B_3$, $B_2$ $C_x$, or a combination thereof converted according to a1), a2), b1), and b2), of a hydrophobic, long-chain monofunctional alcohol $E_1$ having at least 8 carbon atoms, and v) optionally subsequently reacting with a long-chain hydrophobic monocarboxylic acid having at least 8 carbon atoms, wherein at least one of conditions i)-v) are met:

i) the alcohol $B_3$, or $B_2$ and $C_x$, is a hydrophobic alkoxylate comprising reacted propylene oxide, butylene oxide, or styrene oxide, and having an average of at least 1 and at most 100 oxyalkylene units per starter molecule, and a difunctional (for $B_2$), trifunctional (for $B_3$), or x-functional (for $C_x$) starter molecule;

ii) the alcohols $B_3$, or $B_2$ and $C_x$ comprise at least 20 mol % of a long-chain diol or polyol having at least 8 carbon atoms;

iii) the dicarboxylic acid is a hydrophobic long-chain aliphatic dicarboxylic acid, an aromatic or cycloaliphatic dicarboxylic acid having at least 8 carbon atoms, or the polycarboxylic acid $D_y$ having more than two acid groups is a hydrophobic long-chain aliphatic polycarboxylic acid, or an aromatic or cycloaliphatic polycarboxylic acid having at least 9 carbon atoms;

iv) at least 10 mol % and at most 90 mol %, based on alcohols $B_3$, or $B_2$ and $C_x$, converted according to a1), a2), b1), and b2) of a long-chain monoalcohol $E_1$ having at least 8 carbon atoms are also reacted; and v) there is subsequent reaction with 10 to 100 mol %, based on a mean number of OH groups of the hyperbranched polyester, of a long-chain hydrophobic monocarboxylic acid having at least 8 carbon atoms.

14. The process according to claim 13, wherein i) the alcohol $B_3$, or $B_2$ and $C_x$, is a hydrophobic alkoxylate comprising reacted propylene oxide or butylene oxide and having an average of 1 to 15 oxyalkylene units per OH group, and iii) $C_x$ is reacted with a hydrophobic long-chain aliphatic dicarboxylic acid, an aromatic or cycloaliphatic dicarboxylic acid having at least 8 carbon atoms, or with a hydrophobic long-chain aliphatic polycarboxylic acid, or an aromatic or cycloaliphatic polycarboxylic acid $D_y$ having more than two acid groups and at least 9 carbon atoms.

15. The process according to claim 14, wherein the reaction is performed with a long-chain aliphatic dicarboxylic acid having at least 8 carbon atoms or with a hydrophobic long-chain aliphatic polycarboxylic acid having at least 9 atoms.

16. The process according to claim 13, wherein i) the alcohol $B_3$, $B_2$, and $C_x$, or a combination thereof is a hydrophobic alkoxylate comprising reacted propylene oxide or butylene oxide and having an average of 1 to 15 oxyalkylene units per OH group, and iv) from 10 mol % to 90 mol %, based on alcohols $B_3$, $B_2$ $C_x$, or a combination thereof converted according to a1), a2), b1) and b2) of a long-chain monoalcohol having at least 8 carbon atoms are also reacted.

17. The process according to claim 13, wherein i) the alcohol $B_3$, $B_2$ $C_x$, or a combination thereof is a hydrophobic alkoxylate comprising reacted propylene oxide or butylene oxide and having an average of 1 to 15 oxyalkylene units per OH group, and v) then a reaction product formed from a1) and b1) or a2) and b2) is reacted with 10 to 100 mol %, based on a mean number of OH groups of the hyperbranched polyester, of a long-chain hydrophobic monocarboxylic acid F having at least 8 carbon atoms.

18. A process for producing the open-cell polyurethane foam according to claim 1, the process comprising mixing a) a compound comprising isocyanate groups and comprising reacted a1) MDI, optionally a2) a polyetherol, optionally a3) a polyesterol, and, optionally a4) a chain extender, wherein a content of MDI having a functionality of greater than 2 is less than 30% by weight, based on a total weight of the MDI a1), b) a high molecular weight compound comprising a group reactive toward isocyanate, the compound further comprising a polyetherol or a polyesterol or any combination thereof, and having a molecular weight of greater than 450 g/mol, c) a blowing agent comprising water, d) optionally a chain extender, e) optionally a catalyst, and f) optionally another assistant, another additive, or any combination thereof, thereby obtaining a reaction mixture, the process further comprising allowing the reaction mixture to react fully, thereby obtaining the polyurethane foam, wherein the high molecular weight compound b) is a mixture comprising polyester polyol and hyperbranched polycarbonate, said hyperbranched polycarbonate is obtained by a process comprising reacting a carbonic ester ($A_2$) or a derivative thereof with l) an at least trihydric alcohol ($B_3$), or m) a dihydric alcohol ($B_2$) and a x-hydric alcohol ($C_x$) which has more than two OH groups where x is greater than 2, whereby the overall mixture of alcohols has a mean functionality of 2.1 to 10, optionally n) reacting up to 50 mol % based on alcohols $B_3$, or $B_2$, and $C_x$, converted according to a) and b), of a hydrophobic long-chain monofunctional alcohol $E_1$ having at least 8 carbon atoms, o) and optionally subsequently reacting with a long-chain hydrophobic OH-reactive compound F, p) and optionally subsequently reacting with propylene oxide, butylene oxide, or a combination thereof wherein at least one of conditions I)-V) are met:

I) the alcohol $B_3$, $B_2$, and $C_x$, or a combination thereof is a hydrophobic alkoxylate n comprising reacted propylene oxide, butylene oxide, or styrene oxide and having an average of at least 1 and at most 100 oxyalkylene units per starter molecule, and a difunctional (for $B_2$), trifunctional (for $B_3$), or x-functional (for $C_x$) starter molecule;

II) the alcohol $B_3$, $B_2$, $C_x$, or a combination thereof comprises at least 20 mol % of a long-chain diol or polyol having at least 8 carbon atoms;

III) from 10 mol % to 90 mol % based on alcohols $B_3$, $B_2$, $C_x$, or a combination thereof converted according to a) and b) of a long-chain monoalcohol $E_1$ having at least 8 carbon atoms are also reacted;

IV) there is subsequent reaction with 10 to 100 mol % based on a mean number of OH groups of the hyperbranched polycarbonate, of the long-chain hydrophobic OH-reactive compound F having at least 8 carbon atoms; and V) there is a subsequent reaction with, per equivalent of OH groups of the hyperbranched polycarbonate, 1 to 60 equivalents of propylene oxide, butylene oxide, or propylene oxide and butylene oxide.

19. The process according to claim 18, wherein

I) the alcohol $B_3$, $B_2$ $C_x$, or a combination thereof is a hydrophobic alkoxylate comprising reacted propylene oxide or butylene oxide and having an average of 1 to 15 oxyalkylene units per OH group.

20. The process according to claim 18, wherein

I) the alcohol $B_3$, $B_2$, $C_x$, or a combination thereof is a hydrophobic alkoxylate comprising reacted propylene oxide or butylene oxide and having an average of 1 to 15 oxyalkylene units per OH group, and III) at least 10 mol % and at most 90 mol %, based on alcohols $B_3$, $B_2$, $C_x$, or a combination thereof converted according to g) and h) of a long-chain monoalcohol $E_1$ having at least 8 carbon atoms are also reacted.

21. The process according to claim 18, wherein

I) the alcohol $B_3$, $B_2$, $C_x$, or a combination thereof is a hydrophobic alkoxylate comprising reacted propylene oxide or butylene oxide and having an average of 1 to 15 oxyalkylene units per OH group, and IV) then the reaction product formed from g) and h) is reacted with 10 to 100 mol %, based on the mean number of OH groups of the hyperbranched polyester, of a long-chain hydrophobic OH-reactive compound $F_1$ having at least 8 carbon atoms.

22. The process according to claim 18, wherein the polyisocyanate A is a compound comprising reacted a1) MDI and a2) polyesterol.

23. The process according to claim 22, wherein the polyisocyanate A is a compound comprising reacted a1) MDI and a2) polyetherol and a compound comprising reacted a1) MDI and a2) polyesterol.

24. The process according to claim 23, wherein a weight ratio of compound comprising reacted a1) MDI and a2) polyetherol and compound comprising reacted a1) MDI and a3) polyesterol is 35:65 to 70:30.

25. The process according to claim 18, wherein the high molecular weight compound b) comprises exclusively one or more polyesterols.

26. The process according to claim 18, wherein high molecular weight compound b) is any combination of:

a polyesterol obtained from adipic acid, monoethylene glycol, diethylene glycol, butanediol, or any mixture thereof, and optionally, glycerol, trimethylolpropane, or both wherein a molar amount of diols predominates over a molar amount of triols.

27. The open-cell polyurethane foam of claim 1, obtained by a process comprising mixing:

a) a compound comprising isocyanate groups and comprising reacted a1) MDI, optionally a2) a polyetherol, optionally a3) a polyesterol, and, optionally a4) a chain extender, wherein a content of MDI having a functionality of greater than 2 is less than 30% by weight, based on total weight of the MDI a1), b) a high molecular weight compound comprising a group reactive toward isocyanate, the compound further comprising a polyetherol or a polyesterol or any combination thereof, and having a molecular weight of greater than 450 g/mol, c) a blowing agent comprising water, d) optionally a chain extender, e) optionally a catalyst, and f) optionally another assistant, another additive, or any combination thereof, thereby obtaining a reaction mixture, the process further comprising allowing the reaction mixture to react fully, thereby obtaining the polyurethane foam, wherein the compound a2), a3), and b) is at least one polyetherol and at least one polyesterol, a content of polyetherol is greater than 5% by weight, based on a total weight of components a2), a3), and b), and a mean functionality of compounds a2), a3) and b) is less than 2.4.

28. A cleaning sponge comprising the polyurethane foam according to claim 27.

\* \* \* \* \*